(12) United States Patent
Andreis et al.

(10) Patent No.: US 7,565,245 B2
(45) Date of Patent: Jul. 21, 2009

(54) ELECTROMAGNETIC SURVEYING

(75) Inventors: David Andreis, Aberdeen (GB); Lucy MacGregor, Edinburgh (GB); Nikolay Golubev, Missouri city, TX (US)

(73) Assignee: OHM Limited, Aberdeen (GB)

( * ) Notice: Subject to any disclaimer, the term of this patent is extended or adjusted under 35 U.S.C. 154(b) by 0 days.

(21) Appl. No.: 11/858,239

(22) Filed: Sep. 20, 2007

(65) Prior Publication Data

US 2009/0082970 A1    Mar. 26, 2009

(51) Int. Cl.
*G06F 19/00* (2006.01)
(52) U.S. Cl. .......................................................... 702/7
(58) Field of Classification Search ..................... 702/1, 702/7, 14; 324/334, 357, 365
See application file for complete search history.

(56) References Cited

U.S. PATENT DOCUMENTS

2006/0186889 A1*  8/2006  Andreis ....................... 324/345

FOREIGN PATENT DOCUMENTS

| GB | 2382875 | | 6/2003 |
|----|---------|---|--------|
| GB | 2402745 | A | 12/2004 |
| GB | 2411006 | | 8/2005 |
| GB | 2423370 | | 8/2006 |
| GB | 2438430 | A | 11/2007 |

OTHER PUBLICATIONS

Constable, S.C. & Weiss, C., Mapping Thin Resistors and Hydrocarbons with Marine EM Methods: Insights From 1-d Modelling, Geophysics, vol. 71, issue 2, pp. 43-51, Mar. 2006.
Cagniard, L., Basic Theory of the Magneto-Telluric Method of Geophysical Prospecting, Geophysics, vol. 18, issue 3, pp. 605-635, Jul. 1953.

(Continued)

*Primary Examiner*—Bryan Bui
(74) *Attorney, Agent, or Firm*—Locke Lord Bissell & Liddell LLP

(57) ABSTRACT

A method of analysing results from an electromagnetic survey of an area that is thought or known to contain a subterranean resistive or conductive body within a background strata configuration is described. The method comprises providing a set of electromagnetic field data obtained using at least one electromagnetic receiver and at least one electromagnetic source for a range of source-receiver separations, e.g. providing conventional controlled-source electromagnetic survey data. A subset of the electromagnetic field data is identified that comprises data obtained for source-receiver separations greater than a selected threshold offset. The threshold offset is chosen so that data beyond this offset are characteristic of magnetotelluric data. Thus the subset of data is then processed in accordance with a first technique to obtain information on the background strata configuration. Other electromagnetic field data obtained for source-receiver separations less than the threshold offset may then be processed in accordance with a second technique to obtain information on any subterranean resistive or conductive body within the background strata configuration.

34 Claims, 17 Drawing Sheets

OTHER PUBLICATIONS

Vozoff, K., The Magnetotelluric Method in the Exploration of Sedimentary Basins, Geophysics, vol. 37, issue 1, pp. 98-141, Feb. 1972.

Tompkins, M.J. Weaver, R., MacGregor L. M., Effects of Vertical Anisotropy on Marine Active Source Electromagnetic Data and Inversions, EAGE 66th Conference & Exhibition, Paris, Jun. 7-10, 2004.

De Groot-Hedlin, C. & Constable, S.C., Inversion of Magnetotelluric Data for 2D Structure with Sharp Resistivity Contrasts, Geophysics, vol. 69, issue 1, pp. 78-86, Jan. 2004.

MacGregor, L., & Sinha, M., Use of Marine CSEM for Sub-Basalt Exploration, Geophysical Prospecting, vol. 48, pp. 1091-1106.

United Kingdom Patent Search Report for Corresponding United Kingdom Application No. GB0720430.8 dated Feb. 22, 2008.

* cited by examiner

ELECTROMAGNETIC SURVEYING

BACKGROUND ART

The invention relates to seafloor electromagnetic surveying for resistive and/or conductive bodies, for example for oil, gas, methane hydrates etc. and other hydrocarbon reserves or subterranean salt bodies.

Seismic techniques are frequently used during hydrocarbon-exploration expeditions, to identify the existence, location and extent of reservoirs in subterranean rock strata. However, whilst seismic surveying is able to identify such structures, the technique is often unable to distinguish between the different possible compositions of pore fluids within them. This is especially so for pore fluids which have similar mechanical properties, such as oil and seawater. It is therefore generally necessary to employ other survey techniques to determine whether a previously identified reservoir contains oil, for example, or just aqueous pore fluids. One technique is exploratory well drilling in the region of potential interest. However, this is expensive and time consuming. Alternative techniques include electromagnetic (EM) surveying techniques.

EM surveying techniques seek to distinguish oil- and water-filled reservoirs on the basis of their differing electrical properties. One group of EM surveying techniques are the controlled-source EM (CSEM) survey techniques.

CSEM techniques involve transmitting an EM signal into the seafloor, generally using a horizontal electric dipole (HED) source (transmitter), and measuring the response at EM receivers (detectors) for a range of distances from the source (i.e. for a range of source-receiver offsets/separations). Since hydrocarbons are more resistive than seawater (e.g. hydrocarbon-bearing sediments typically have resistivities on the order of a few tens of Ωm or higher versus a few Ωm or so for water bearing sediments), the presence of a hydrocarbon-bearing reservoir will, in general, lead to stronger EM fields than would be the case if the reservoir contained only seawater. This is because the highly conducting seawater attenuates the component of the EM signal passing through the reservoir more than would be the case if the reservoir contained hydrocarbon. Conversely, the presence of relatively more conductive structures in the subterranean strata will, in general, lead to weaker EM fields seen at the detector. This is because of the increased attenuation of fields in the conductive structure. Thus an analysis of the electromagnetic fields measured during a CSEM survey, e.g. field amplitudes and phases, can in principle provide information on subterranean resistivity profiles, and hence likely reservoir content.

In practice the interpretation of CSEM survey results is not so simple. This is because CSEM surveys are primarily sensitive to the transverse resistance of the subterranean strata (i.e. primarily dependent on the resistivity-thickness product of subterranean layers). Because of this the effects on detected EM fields caused by the presence of a thin resistive layer (e.g. a hydrocarbon reservoir) can be indistinguishable from the effects arising from other realistic large scale subterranean strata configurations. For example, CSEM data from subterranean strata comprising a thin resistive hydrocarbon reservoir embedded in a largely uniform resistivity background can be similar to data from a subterranean strata configuration comprising larger-scale layers having increasing resistivity with depth [1]. This kind of increasing-resistivity structure is a feature of some submarine sedimentary basins, for example, and can arise due to the progressive expulsion of conductive pore fluids with increasing depths by a rising overburden pressure. Because of this possible ambiguity, it is known that data which are primarily sensitive to thin resistive/conductive layers and data which are primarily sensitive to the large-scale background structure of the subterranean strata are needed for a comprehensive CSEM survey [1].

Various different techniques have been proposed to provide suitable differently sensitive data. Fundamentally the techniques are based on the simultaneous interpretation of two contrasting EM datasets. One data set comprises data which are primarily dependent on a transverse electric (TE) mode of coupling between the source and the receiver. The other data set comprises data which are primarily dependent on a transverse magnetic (TM) mode of coupling between the source and the receiver.

EM signals used in CSEM generally comprise TE and TM mode components. The response of seawater and subterranean strata (which will typically approximate a series of planar horizontal layers) to EM signals is generally different for TE mode components of the transmitted signal, which excite predominantly horizontal current flows, and TM mode components, which excite significant components of vertical current flow. For TE mode components, the coupling between horizontal layers comprising the subterranean strata is largely inductive. This means the presence of thin resistive layers (which are indicative of hydrocarbon reservoirs) does not significantly affect the EM fields detected at the surface as the large scale current flow pattern is not affected by the thin layer (since the subterranean fields couple relatively well across the thin layer). However, for TM mode components the coupling between layers includes a significant galvanic component (i.e. due to the direct transfer of charge between layers). Thus for the TM mode even a thin resistive layer strongly affects the EM fields detected at the receiver since the large scale current flow pattern is disrupted by the resistive layer.

Thus to resolve the above-mentioned possible ambiguities in interpreting CSEM data it is known to determine the response of the subterranean strata to both TE mode components (i.e. inductively coupled and most sensitive to large-scale background structure) and TM mode components (i.e. galvanically coupled and more sensitive to thin resistive/conductive layers) [1]. Approaches based on these principles thus provides two complementary data sets having different relative sensitivities to the TE and TM mode components of the transmitted EM signals. Analysis of these complementary data sets can then reveal differences between the TE mode and TM mode coupling between the source and receiver, and these differences are indicative of the presence or not of a subterranean hydrocarbon reservoir.

One proposed way of obtaining respective TE and TM dominated data sets is to obtain data for different relative orientations between a towed HED source and receivers in an array [1]. According to this scheme, data from receivers which are arranged inline with the HED source (i.e. on a line parallel to and passing through the dipole axis of the HED transmitter) are TM mode dominated (sensitive to the presence of thin resistive layers indicative of hydrocarbon-bearing reservoirs), whereas data from receivers which are arranged broadside to the HED source (i.e., on a line perpendicular to and passing through the HED axis), are TE mode dominated (more sensitive to characteristics of the large scale background). This splitting arises from the inherent geometry of the dipole field from the source. However, a drawback of this geometric-splitting based approach is the need to obtain data for multiple specific source-receiver alignments results in complex tow paths. These are costly and time consuming to perform and provide relatively little data of the highest possible quality (since much of the data is neither inline nor broadside but is intermediate between the two).

Another proposed way of obtaining respective TE and TM dominated data sets is to mathematically decompose CSEM data into TE and TM mode components [2, 3]. This can be done for data obtained over a range of source-receiver orientations and so more efficient tow paths and so can employed than for schemes based on geometric-splitting. However, these mathematical decomposition schemes are relatively sensitive to noise in the CSEM data sets, and also require specialised receiver designs which capable of measuring spatial gradients in electromagnetic field components.

Yet another proposed scheme for obtaining respective TE and TM dominated data sets is to collect conventional CSEM inline data (primarily TM mode coupled), and to separately collect data using the passive magneto-telluric (MT) method [4]. In an MT survey, signals at a surface-based electromagnetic detector arising in response to EM fields generated naturally, such as within the earth's upper atmosphere, are measured [5, 6]. The measured responses can provide information about the subterranean rock strata beneath the detectors. Generally all but those MT signals with periods corresponding to several cycles per hour are screened from the seafloor by the overlying highly conductive seawater. The long wavelength signals which do penetrate to the seafloor do not provide sufficient spatial resolution to examine the electrical properties of small scale subterranean reservoirs, but can be used for larger-scale undersea probing. Furthermore the MT signals at the seafloor comprise primarily horizontally polarised EM fields and so are intrinsically insensitive to thin resistive layers. Thus MT data can be used in place of TE dominated controlled source data to provide information on the large scale background subterranean strata configuration.

The CSEM plus MT technique allows the CSEM data to be collected more efficiently than schemes based on geometric-splitting (since only inline data are needed). Furthermore the CSEM data may be collected using conventional receivers. However, a drawback of the CSEM plus MT technique is the need to separately acquire two independent data sets. This is because the CSEM source is switched off to acquire MT data. Furthermore, MT signals are uncontrolled and often weak. This means a significant amount of data stacking can be required to reach an appropriate signal to noise ratio. In some cases several days of MT data must be recorded to ensure signal quality, increasing the time for which receivers must be deployed compared to a standard CSEM survey and therefore the overall commercial cost. Furthermore still, only low frequency data can generally be used as higher frequency signals undergo too much attenuation in seawater overlaying the area being surveyed. This means in practice that good quality data are not acquired in the same frequency band as for the CSEM data. This makes each data set differently sensitive to different regions in the subterranean strata and this increases the complexity of data interpretation.

There is therefore a need for methods of analysing CSEM data which do not suffer from the above-described drawbacks of known techniques.

SUMMARY OF THE INVENTION

According to a first aspect of the invention there is provided a method of analysing results from an electromagnetic survey of an area that is thought or known to contain a subterranean resistive or conductive body within a background strata configuration, comprising: providing a set of electromagnetic field data obtained using at least one electromagnetic receiver and at least one electromagnetic source for a range of source-receiver separations; identifying a subset of the electromagnetic field data which comprises data obtained for source-receiver separations greater than a threshold offset; processing the subset of the electromagnetic field data for source-receiver separations greater than the threshold offset in accordance with a first technique to obtain information on the background strata configuration; and processing electromagnetic field data obtained for source-receiver separations less than the threshold offset in accordance with a second technique to obtain information on any subterranean resistive or conductive body within the background strata configuration.

The resistive or conductive body might be a body which is more resistive than surrounding strata, such as a hydrocarbon reservoir (e.g. oil, gas, methane hydrate) or salt body, or a body which is more conductive than surrounding strata, such as siliceous sediments.

The approach of embodiments of the invention is thus based on the use of data from different ranges of source-receiver separations to provide a first group of data sensitive to large-scale background strata, and a second group of data sensitive to thin resistive or conductive layers. Thus the threshold offset may be selected such that the identified subset of electromagnetic data comprises data dominated by a transverse electric (TE) mode of coupling between the source and the receiver (e.g. because it is air-wave dominated).

A suitable threshold offset may be predefined, e.g. having a value selected from the group consisting of 5 km, 6 km, 7 km, 8 km, 9 km, 10 km, 11 km, 12 km, 13 km, 14 km and 15 km. In some cases the predefined threshold offset might be selected according to an expected offset beyond which data become TE mode dominated based on information available (i.e. known characteristics such as water depth, subterranean structure) about the area being surveyed. Alternatively, the threshold offset may be determined from the electromagnetic field data itself. E.g. from an analysis of changes in the electromagnetic field data with source-receiver separation. For example, a threshold offset may be determined from an analysis of rates of changes in the electromagnetic field data with source-receiver separation.

Thus in some embodiments a threshold offset may be determined by analysing the electromagnetic field data in accordance with the first technique to obtain an estimated characteristic parameter of the background strata configuration (e.g. an apparent resistivity or phase impedance), and determining the threshold offset based on a rate of change of the estimated characteristic parameter with source-receiver separation. This process may include applying a smoothing function to the estimated characteristic parameter to reduce to variations with source-receiver separation prior to determining the threshold offset, for example if the data are noisy. Applying the smoothing function may, for example, comprise determining a moving average of the estimated characteristic parameter over a source-receiver separation averaging window, e.g. an averaging window having a width selected from the group comprising 100 m, 200 m, 300 m, 400 m, 500 m, 600 m, 700 m, 800 m, 900 m and 1000 m.

The threshold offset may be taken to be the smallest source-receiver separation at which the rate of change of the characteristic parameter (after filtering where this is employed) is less than a defined amount. Additionally it may also be required that the rate of change of the characteristic parameter remains below the defined amount for a certain separation range, e.g. for at least 500 m or 1000 m for example.

The defined amount may, for example, be a percentage of a value of the characteristic parameter in the vicinity of each source-receiver separation (e.g. around 250 m or so away—i.e. at a neighbouring measurement), and the percentage may be selected from a group comprising 3%, 2.5%, 2%, 1.5%, 1% and 0.5%. These example values may be considered appropriate for a typical separation between neighbouring data points of 250 m or so. Correspondingly scaled (up or down) values may be appropriate for other binning separations.

The threshold offset may be determined based on a comparison of vertical components electric field with horizontal components of electric field. For example, this comparison may include forming a ratio of relative strengths for the vertical and horizontal electric filed components as a function of offset, and determining a source-receiver separation at which this ratio falls below a predetermined threshold ratio value as a suitable threshold offset. The predetermined threshold ratio value may, for example, be selected from the group consisting of 0.05, 0.04, 0.03, 0.02 and 0.01.

The source may comprise a horizontal electric dipole (HED) transmitter, and the electromagnetic data may comprise data obtained at locations in line with an axis of extent of the HED transmitter. Thus the analysis may be applied to conventionally obtained inline CSEM data.

The first technique may be a conventional magnetotelluric (MT) processing technique. This is a known way of analysing TE dominated data to obtain information on large-scale subterranean strata. Furthermore, processing the subset of the electromagnetic field data in accordance with the first technique may include combining data from different source-receiver separations into a single datum. This allows for an improved signal-to-noise level without necessarily adversely impacting spatial resolution.

The second processing technique may be any conventional technique for analysing CSEM data to identify thin layers—e.g. a wavefield imaging processing technique or an inversion analysis processing technique may be used.

Furthermore, it should be noted that processing the electromagnetic field data obtained for source-receiver separations less than the threshold offset in accordance with the second technique may include processing electromagnetic field data obtained for source-receiver separations both above and below than the threshold offset in accordance with the second technique. That is to say, all data may be processed in accordance with the second technique and not only data from source-receiver separations less than the threshold offset. Nonetheless, in some cases it may be preferable to process only the electromagnetic field data obtained for source-receiver separations less than the threshold offset in accordance with the second technique. Thus the two subsets of data respectively processed according to the first and second techniques are independent of one another. Information on the subterranean strata derived from processing in accordance with one of the techniques may then be used to provide constraints (e.g. boundary conditions) on the processing in accordance with the other technique.

According to a second aspect of the invention there is provided a computer program product bearing machine readable instructions for implementing the method of the first aspect of the invention.

According to a third aspect of the invention there is provided a computer apparatus loaded with machine readable instructions for implementing the method of the first aspect of the invention.

According to a fourth aspect of the invention there is provided a method of planning an electromagnetic survey of an area that is thought or known to contain a subterranean resistive or conductive body, comprising: creating a model of the area to be surveyed including a rock formation comprising a background strata configuration containing a postulated resistive or conductive body, and a body of water above the rock formation; setting values for water depth, depth of the postulated resistive or conductive body, and resistivity structure of the rock formation; performing a simulation of an electromagnetic survey in the model of the survey area by calculating horizontal electric and magnetic field data obtained by at least one simulated electromagnetic receiver detecting signals from at least one simulated electromagnetic source for a range of source-receiver separations; identifying a subset of the electromagnetic field data which comprises data obtained for source-receiver separations greater than a threshold offset; processing the subset of the electromagnetic field data for source-receiver separations greater than the threshold offset in accordance with a first technique to obtain information on the background strata configuration; and processing electromagnetic field data obtained for source-receiver separations less than the threshold offset in accordance with a second technique.

Repeated simulations for a number of source-receiver horizontal separations and frequencies of signal can be performed in order to allow optimum surveying conditions in terms of source-to-receiver distance and frequency of EM signal for probing the resistive or conductive body to be selected when performing an electromagnetic survey. The effects and usefulness of differing receiver array configurations and transmitter tow paths can also be modelled. This kind of modelling can also help in determining a suitable threshold offset beyond which the data in a "real" survey of the area are likely to be TE dominated (e.g. if a simulation based on known/postulated information about an area shows data are TE dominated beyond X km, then this might be taken as a suitable threshold offset for a real survey of the area).

According to a fifth aspect of the invention there is provided a computer program product bearing machine readable instructions for implementing the method of the fourth aspect of the invention.

According to a sixth aspect of the invention there is provided a computer apparatus loaded with machine readable instructions for implementing the method of the fourth aspect of the invention.

According to a seventh aspect of the invention there is provided a method of performing an underwater CSEM survey of an area that is thought or known to contain a subterranean hydrocarbon reservoir, comprising: providing at least one electromagnetic source and at least one electromagnetic receiver for transmission and detection of electromagnetic signals; obtaining a set of electromagnetic field data from the at least one electromagnetic receiver and at least one electromagnetic source for a range of source-receiver separations; identifying a subset of the electromagnetic field data which comprises data obtained for source-receiver separations greater than a threshold offset; processing the subset of the electromagnetic field data for source-receiver separations greater than the threshold offset in accordance with a first technique to obtain information on the background strata configuration; and processing electromagnetic field data obtained for source-receiver separations less than the threshold offset in accordance with a second technique.

According to an eighth aspect of the invention there is provided a method for obtaining hydrocarbon from an area that contains a subterranean hydrocarbon reservoir, comprising: providing at least one electromagnetic source and at least one electromagnetic receiver for transmission and detection of electromagnetic signals; obtaining a set of electromagnetic field data from the at least one electromagnetic receiver and at least one electromagnetic source for a range of source-receiver separations; identifying a subset of the electromagnetic field data which comprises data obtained for source-receiver separations greater than a threshold offset; processing the subset of the electromagnetic field data for source-receiver separations greater than the threshold offset in accordance with a first technique to obtain information on the background strata configuration; processing electromagnetic field data obtained for source-receiver separations less than the threshold offset in accordance with a second technique to obtain information on any hydrocarbon reservoir within the background strata configuration; identifying the hydrocarbon reservoir from the results of processing electromagnetic field data in accordance with the second technique; and penetrating the identified hydrocarbon reservoir with a hydrocarbon-producing well.

According to a ninth aspect of the invention there is provided a volume of hydrocarbon obtained from an area that contains a subterranean hydrocarbon reservoir, the hydrocarbon obtained by: providing at least one electromagnetic source and at least one electromagnetic receiver for transmission and detection of electromagnetic signals; obtaining a set of electromagnetic field data from the at least one electromagnetic receiver and at least one electromagnetic source for a range of source-receiver separations; identifying a subset of the electromagnetic field data which comprises data obtained for source-receiver separations greater than a threshold offset; processing the subset of the electromagnetic field data for source-receiver separations greater than the threshold offset in accordance with a first technique to obtain information on the background strata configuration; processing electromagnetic field data obtained for source-receiver separations less than the threshold offset in accordance with a second technique to obtain information on any hydrocarbon reservoir within the background strata configuration; identifying the hydrocarbon reservoir from the results of processing electromagnetic field data in accordance with the second technique; penetrating the identified hydrocarbon reservoir with a hydrocarbon-producing well; and extracting the hydrocarbon from the reservoir using the well.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
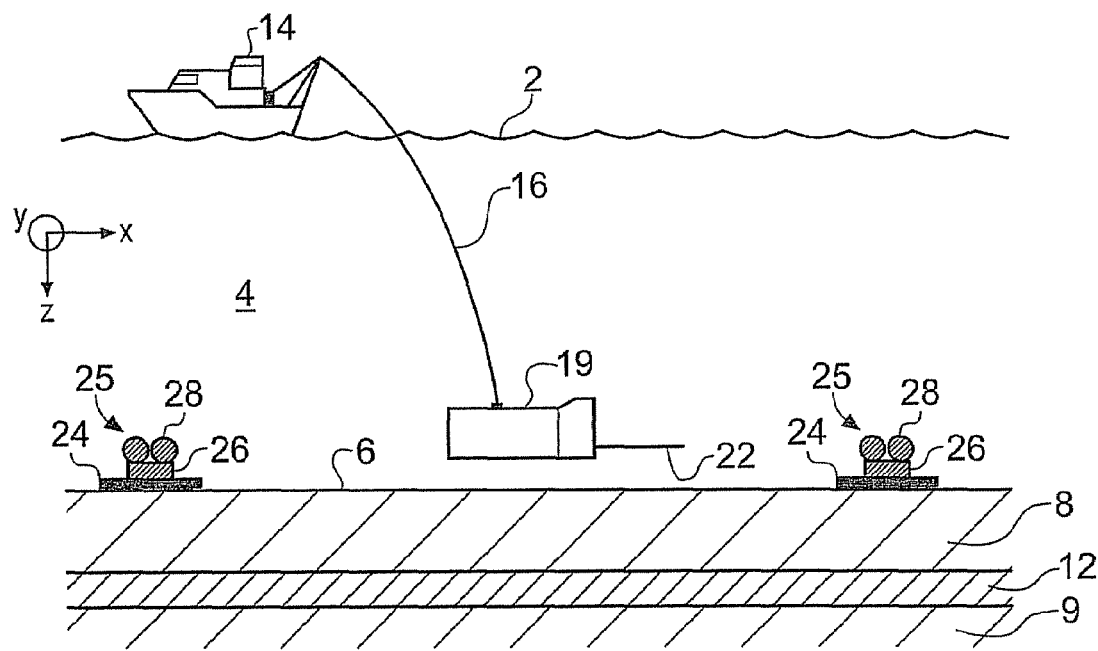
FIG. 1 schematically shows a surface vessel undertaking controlled source electromagnetic (CSEM) surveying of a subterranean strata configuration using standard apparatus.

FIG. 1 schematically shows a surface vessel 14 undertaking controlled source electromagnetic (CSEM) surveying of a subterranean strata configuration using standard apparatus [1] to obtain data suitable for analysis according to an embodiment of the invention. The subterranean strata in this example includes an overburden layer 8, an underburden layer 9 and a hydrocarbon reservoir 12. The surface vessel 14 floats on the surface 2 of a body of water, in this case seawater 4. A submersible vehicle 19 carrying a source (transmitter) 22 in the form of a horizontal electric dipole (HED) is attached to the surface vessel 14 by an umbilical cable 16. The umbilical cable provides an electrical, mechanical and optical connection between the submersible vehicle 19 and the surface vessel 14. The HED source 22 is supplied with a drive current such that it broadcasts an HED electromagnetic (EM) signal into the seawater.

One or more remote receivers (detectors) 25 are located on the seafloor 6. Each of the receivers 25 include an instrument package 26, a detector antenna 24, a floatation device 28 and a ballast weight (not shown). Each detector antenna 24 comprises three orthogonal electric dipole antennae (generally two horizontal and one vertical, but other configurations may be used), and three orthogonal magnetic dipole antennae (again generally two horizontal and one vertical, but possibly in other configurations). In other examples, fewer components of EM fields at the receiver may be measured, e.g. vertical field components may not be desired. The electric dipole detector antennae are sensitive to the electric field components of the electromagnetic fields induced by the HED source in the vicinity of the receiver 25, and produce electric field detector signals therefrom. The magnetic dipole detector antennae are sensitive to magnetic field components of the electromagnetic fields induced by the HED source in the vicinity of the receiver 25, and produce magnetic field detector signals therefrom.

During a survey, the instrument package 26 records the electric and magnetic detector signals while the transmitter 22 is towed relative to the receivers 25. Thus detector signals for a range of relative source-detector separations (offsets) are obtained to provide a survey data set of the region being surveyed. In this embodiment a plurality of the detectors 25 are arrayed along a straight line and collect data as the HED source is towed along a path above the line of the detectors. Thus the data obtained during the survey from each detector are primarily inline data from a range of source-receiver separations. The resulting data can be interpreted using a combination of forward modeling, geophysical inversion and imaging/migration techniques to determine the resistivity structure of the underlying seafloor to depths of several kilometers.

The direction of x-, y- and z-axes of a Cartesian co-ordinate system which may be used for describing the geometry of the source and receivers is schematically shown at the left of FIG. 1. The x-axis runs parallel to the source dipole axis. The y-axis runs perpendicular to the source dipole axis and in the horizontal plane. The z-axis runs vertically downwards into the seafloor. Although the Cartesian co-ordinate system is shown displaced from the source 22 in FIG. 1 for clarity, in general the origin of the Cartesian co-ordinate system will be considered to be at the centre of the source.

The source and receiver geometries may also be described in a cylindrical polar co-ordinate system centred on, and aligned with, the source. In this polar coordinate system a location is defined relative the source dipole by a separation R, an azimuth angle $\theta$, and a depth Z. Separation R is a distance from the centre of the source 22 to the location. Azimuth angle $\theta$ is an angle made by an imaginary line from the source to the location of a receiver and a line passing through, and running parallel to, the source's dipole axis (measured clockwise when viewed from above). Thus a receiver at an azimuthal angle $\theta$ of 0° (or 180°) is in an exactly inline (end-on) position and a receiver at an azimuthal angle $\theta$ of 90° (or 270°) is in an exactly broadside position. The depth (axial) co-ordinate Z extends vertically downwards into the seafloor. For analysis the electric fields at a receiver are often (though not always) resolved into a radial component $E_r$, which is parallel to an imaginary line from the source to the receiver, and an orthogonal azimuthal component $E_\theta$ in the horizontal plane, and also a vertical component $E_z$ where vertical field data are available. Thus for an inline configuration the radial component $E_r$ is also inline with the source dipole axis and for a broadside configuration the radial component $E_r$ is perpendicular to the source dipole axis. Magnetic fields at the receiver are similarly often resolved into a radial component $B_r$, an azimuthal component $B_\theta$, and a vertical component $B_z$.

Features of embodiments of the invention will be described using modelled survey data obtained for a range of different model configurations. For simplicity the models used here comprise one-dimensional structures, i.e. they comprise layers of infinite horizontal extent. For ease of comparison the main examples of the various model configurations are first described together with reference to FIGS. 2A to 2F.

Figure 2A:
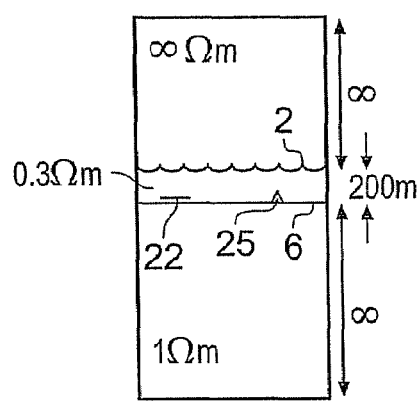
FIGS. 2A to 2F show in schematic vertical section various model strata configurations.

FIG. 2A schematically shows in vertical section a first model configuration. This configuration comprises a section of seafloor 6 beneath seawater of relatively shallow depth, namely around 200 m. The seawater in this example model (and in all the other models used here) has a resistivity of 0.3125 Ωm. Beneath the seafloor 6 is a uniform isotropic half-space sedimentary structure. This subterranean structure has a resistivity of 1 Ωm and extends downwards for an infinite extent. The low resistivity of the subterranean region is primarily due to aqueous saturation of pore spaces. Above the seawater is an air layer. This is taken to have infinite resistivity and to extend upwards for an infinite extent. Also indicated in FIG. 2A are an HED source 22 and a receiver 25 of the kind shown in FIG. 1. The distance between the source and the receiver (i.e. the source-receiver separation) is R. The receiver is aligned inline (i.e. $\theta=0$) with the source. The model configuration shown in FIG. 2A will be referred to as a shallow-water uniform-background configuration.

Figure 2B:
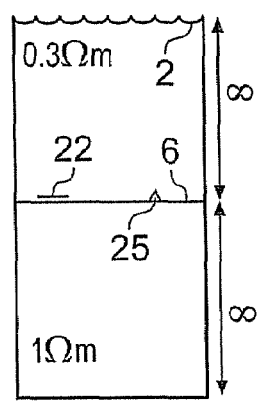

FIG. 2B schematically shows in vertical section a second model configuration. FIG. 2B is similar to and will be understood from FIG. 2A. However, the configuration shown in FIG. 2B differs from that shown in FIG. 2A in that in FIG. 2B there is no air layer and the seawater is of infinite depth. This model configuration will be referred to as an infinite-water uniform-background configuration.

Figure 2C:
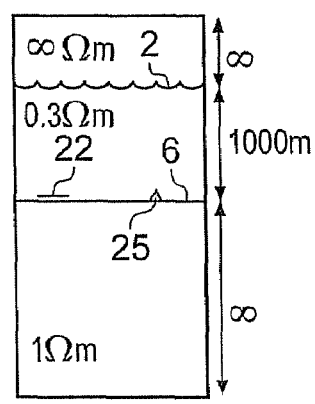

FIG. 2C schematically shows in vertical section a third model configuration. FIG. 2C is again similar to and will be understood from FIG. 2A. However, the configuration shown in FIG. 2C differs from that shown in FIG. 2A in that the seawater is deeper, having a depth of 1000 m in FIG. 2C as opposed to 200 m in FIG. 2A. This model configuration will be referred to as a deep-water uniform-background configuration.

Figure 2D:
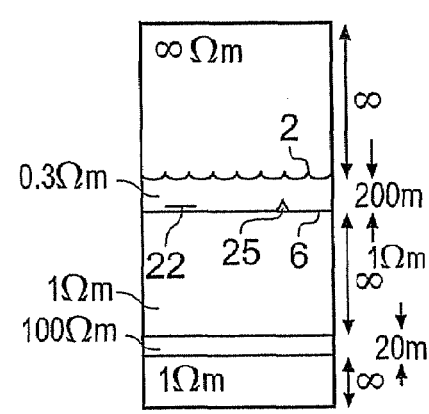

FIG. 2D schematically shows in vertical section a fourth model configuration. FIG. 2D is similar to and will be understood from FIG. 2A. However, the configuration shown in FIG. 2D differs from that shown in FIG. 2A in that the strata beneath the seafloor 6 includes a relatively thin and relatively high resistivity layer representing a hydrocarbon reservoir. Thus the strata beneath the seafloor 6 (working downwards from the seafloor) first comprises a 1000-m thick overburden layer having an isotropic resistivity of 1 Ωm (again due to aqueous saturation of pore spaces in the sediment). Beneath the overburden layer is a 100-m thick hydrocarbon reservoir layer having a resistivity of 100 Ωm. The resistivity of the hydrocarbon layer/reservoir is greater than that of the surrounding layers due to the presence of non-conducting hydrocarbon within pore spaces. Finally, below the hydrocarbon reservoir is a sedimentary underburden layer which, as for the overburden layer, has an isotropic resistivity of 1 Ωm. The underburden layer extends downwards for an effectively infinite extent. Thus the configurations in FIGS. 2A and 2D are identical except for the presence of the hydrocarbon reservoir in FIG. 2D. The model configuration schematically shown in FIG. 2D will be referred to as a shallow-water hydrocarbon-bearing configuration.

Figure 2E:
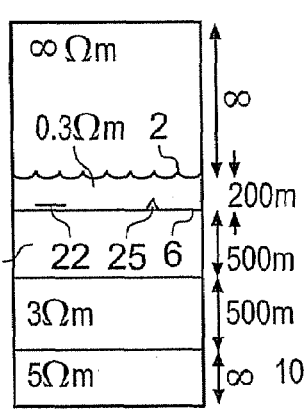

FIG. 2E schematically shows in vertical section a fifth model configuration. FIG. 2E is yet again similar to and will be understood from FIG. 2A. However, the configuration shown in FIG. 2E differs from that shown in FIG. 2A in that the strata beneath the seafloor 6 comprise a series of layers having increasing resistivity with depth. As noted above, this kind of increasing-resistivity structure is a feature of some submarine sedimentary basins, for example due to the progressive expulsion of conductive pore fluids with increasing depths by a rising overburden pressure. Thus the subterranean strata beneath the seafloor 6 in FIG. 2E (working downwards from the seafloor) comprises a first layer having a thickness of 500 m and a resistivity of 1 Ωm. Beneath this is a second layer having a thickness of 500 m and a resistivity of 3 Ωm. Finally, below the second layer is a third layer having a resistivity of 5 Ωm and extending downwards for an effectively infinite extent. The model configuration schematically shown in FIG. 2E will be referred to as a shallow-water increasing-resistivity configuration.

Figure 2F:
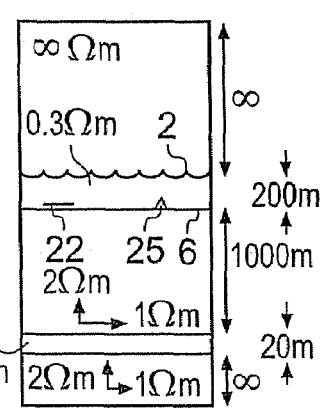

Finally, FIG. 2F schematically shows in vertical section a sixth model configuration. FIG. 2F is similar to and will be understood from FIG. 2D. However, the configuration shown in FIG. 2F differs from that shown in FIG. 2D in that the overburden layer and underburden layers in the strata beneath the seafloor in FIG. 2F have anisotropic resistivities (differing resistivities in the vertical and horizontal directions). For the model configuration in FIG. 2F, the overburden and underburden layers both have resistivities of 1 Ωm in horizontal directions and 2 Ωm in vertical directions. This kind of anisotropy in the earth is often displayed in sand and shale layers. Grain alignment of clay minerals in sedimentary layers can also lead to anisotropic resistivity, as can alignment of fractures in subterranean layers. The model configuration schematically shown in FIG. 2F will be referred to as a shallow-water hydrocarbon-bearing anisotropic configuration.

Figure 3A:
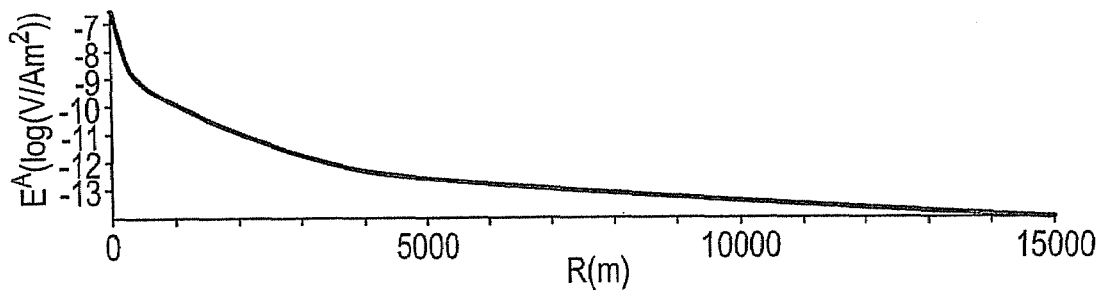
FIGS. 3A and 3B respectively show electric and magnetic field amplitudes as a function of source-receiver separation for a modelled CSEM survey for the model strata configuration shown in FIG. 2A.

FIG. 3A is a graph schematically showing the modelled radial electric field component amplitude $E^A$ seen at a receiver in an inline orientation (i.e. $\theta=0$) in response to an HED source broadcast signal as a function of separation R between the source and the receiver for the shallow-water uniform-background model configuration shown in FIG. 2A. The HED source in this example is driven by an AC drive signal at a frequency of 0.25 Hz and the electric field is calculated in volts per meter at the receiver per unit transmitter electric dipole moment. This curve shows the decay in electric field amplitude with increasing source-receiver separation caused by attenuation in the conducting media through which the energy propagates and geometric spreading effects.

Figure 3B:
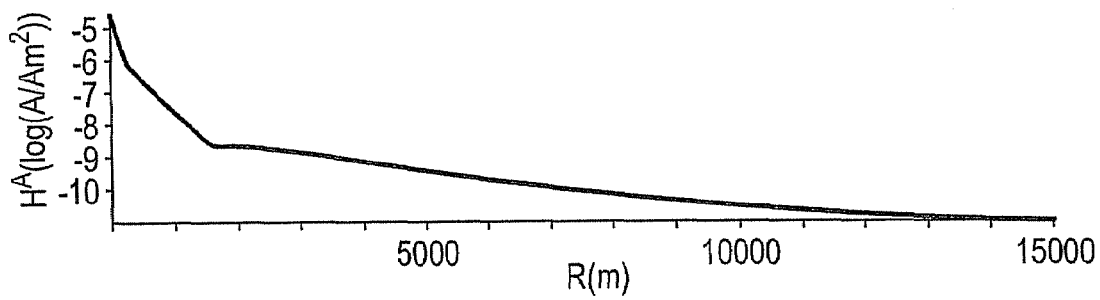

FIG. 3B is a graph schematically showing the modelled azimuthal magnetic field component amplitude $H^A$ seen at a receiver in an inline orientation (i.e. $\theta=0$) in response to an HED source broadcast signal as a function of separation R between the source and the receiver for the shallow-water uniform-background model configuration shown in FIG. 2A. The HED source in this example is again driven by an AC drive signal at a frequency of 0.25 Hz and the magnetic field is calculated in amps per meter at the receiver per unit transmitter electric dipole moment.

Figure 4A:
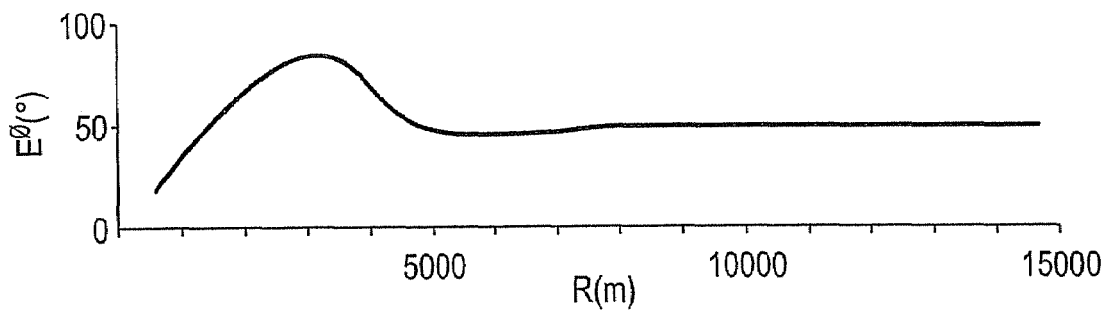
FIGS. 4A and 4B respectively show phases of the electric and magnetic fields whose amplitudes are shown in FIGS. 3A and 3B relative to the source signal.
Figure 4B:
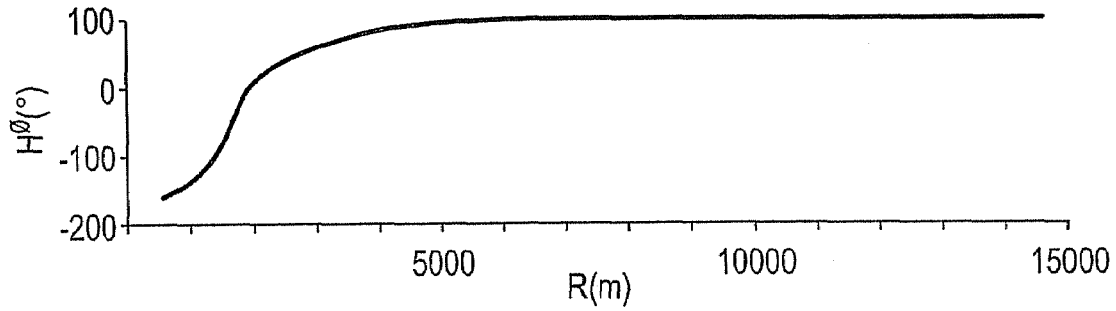

FIG. 4A is a graph schematically showing the phase $E^\Phi$ of the modelled radial electric field component whose amplitude is plotted in FIG. 3A relative to the HED source AC drive signal. This is again shown as a function of separation R between the source and the receiver. The phase $E^\Phi$ is shown as a lag, that is to say, a positive value indicates that the phase of the AC signal seen at the receiver lags the phase of the AC signal broadcast by the source. FIG. 4B similarly schematically shows the phase $H^\Phi$ of the modelled azimuthal electric magnetic component whose amplitude is plotted in FIG. 3B.

Thus the model curves shown in FIGS. 3A, 3B, 4A and 4B are all calculated for the same model strata configuration and the same source characteristics. Accordingly they represent characteristics of electric field data and magnetic field data (collectively electromagnetic data) that would be simultaneously obtained during a conventional CSEM survey.

In addition to modelling the electric and magnetic fields seen at receivers in a model CSEM survey such as shown in FIGS. 3A, 3B, 4A and 4B, parameters of the electromagnetic field can also be modelled at arbitrary locations within the model earth configuration.

Figure 5A:
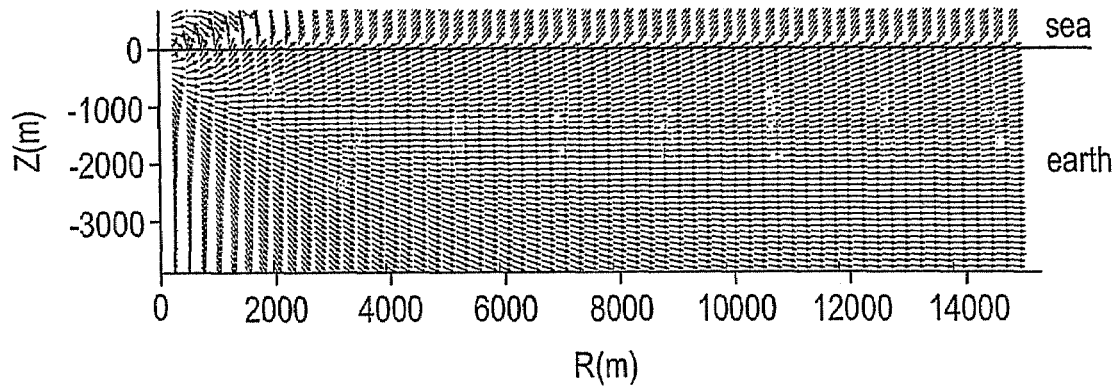
FIGS. 5A and 5B schematically show the direction of the in-phase component of the Poynting vector calculated on a grid of locations within a vertical slice of the model strata shown in FIGS. 2B and 2A respectively.

Thus FIG. 5A shows the direction of the in-phase component of the Poynting vector (i.e. E×H) calculated on a grid of locations within a vertical slice of the infinite-depth uniform-background model strata shown in FIG. 2B. The data are calculated for an HED source near the seafloor which has the same characteristics as the source used in the model for FIGS. 3A, 3B, 4A and 4B, i.e. transmitting in this example an AC signal at 0.25 Hz. Referring to the orientation of the Cartesian co-ordinate system shown in FIG. 1, the vertical slice is in the xz-plane, i.e. in a vertical plane that contains the axis of extent of the dipole comprising the source with the source being at the origin (i.e. at x=z=0). Thus separation R is measured parallel to the x-direction. The Poynting vector shows the direction of electromagnetic energy flow within the plane of the figure. It can seen from FIG. 5A that for this infinite-depth uniform-background model strata the energy flow is largely in a generally radial direction away from the source at all locations. There are locations where the energy flow is not exactly radial, but the overall pattern may be considered as being characteristically radial. Thus the propagation coupling for all source-receiver separations includes significant a TM mode component and so is sensitive to the presence of thin and/or thick resistive or conductive structures.

Figure 5B:
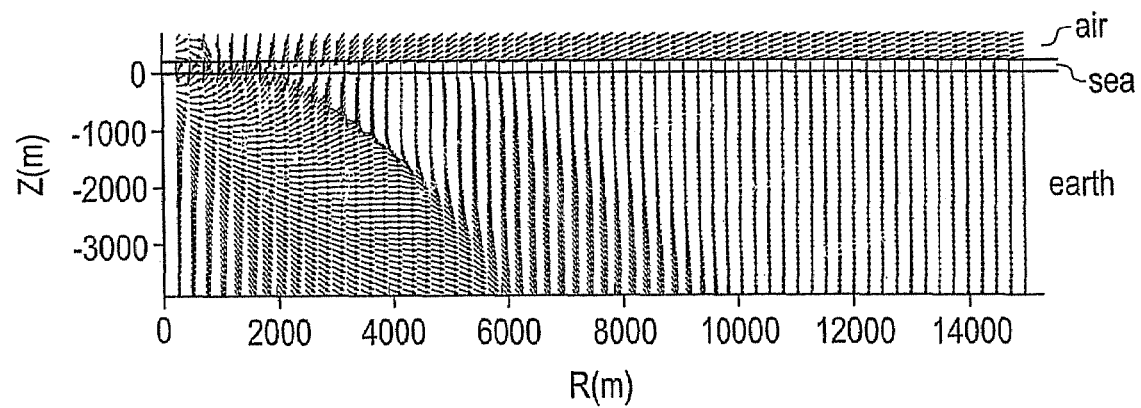

FIG. 5B is broadly similar to and will be understood from FIG. 5A. However, FIG. 5B shows the direction of the in-phase component of the Poynting vector for the shallow-depth uniform-background model strata shown in FIG. 2A. Thus the only difference between FIGS. 5A and 5B is in the depth of water in the model strata configuration. In FIG. 5A it is infinite, in FIG. 5B it is 200 m. This difference in water depth can be seen to significantly affect the overall pattern of energy flow within the seawater and the subterranean strata. This difference is caused by the effects of electromagnetic energy interacting with the air overlying the seawater. Towards smaller source-receiver separations, a similar characteristically radial flow of electromagnetic energy can be seen to that seen in FIG. 5A, especially towards increasing depth below the seafloor. Thus a significant TM mode of propagation occurs in these regions. However, at greater source-receiver separations, the electromagnetic energy in the seawater and subterranean strata can be seen to be primarily flowing vertically. This type of vertical EM energy flow corresponds with electric and magnetic fields that are horizontal. This means the resulting current flows induced in the earth are also primarily horizontal. Horizontal current flows are, as noted above, a characteristic of a TE dominated mode of coupling. Indeed the type of vertical flowing EM energy seen in FIG. 5B is a characteristic feature of the typical energy flows associated with MT signals. Thus it can be seen that a subset of a conventional inline CSEM data set, i.e. a subset corresponding to data for source-receiver separations greater than a threshold offset, are dominated by TE modes of propagation coupling.

This similarity between the energy flows in an inline CSEM survey at relatively large source-receiver separations and the energy flows in an MT survey means long-offset inline CSEM survey data could be analysed according to techniques employed for analysing MT survey data to obtain information on the large-scale background subterranean strata configuration. That is to say, large-offset inline CSEM data can provide the TE mode dominated data desired for resolving the possible ambiguities that arise from using solely TM mode dominated CSEM data. This TE mode dominated data are provided without requiring the complex tow paths, specialised receivers, or reliance on naturally occurring MT signals associated with known schemes for providing TE mode dominated data. What is more, so long as sufficiently large offsets (source-receiver separations) are presented when collecting the CSEM data, the TE dominated data are obtained without any significant additional data-collection overheads.

In accordance with one conventional approach to MT analysis, an MT response function is defined by an impedance tensor Z comprising a frequency dependant 2×2 matrix [5, 6] which depends on the electrical resistivity (inverse of conductivity) of the subsurface. I.e.

$$\begin{vmatrix} E_x(\omega) \\ E_y(\omega) \end{vmatrix} = \begin{vmatrix} Z_{xx}(\omega) & Z_{xy}(\omega) \\ Z_{yx}(\omega) & Z_{yy}(\omega) \end{vmatrix} \begin{vmatrix} H_x(\omega) \\ H_y(\omega) \end{vmatrix}$$

Where $\omega=2\pi f$ is the angular frequency of the source signal (i.e. f is the frequency of the source signal), E is the electric field and H is the magnetic field measured by a receiver on the seafloor, and the subscripts x and y designate components of the fields along two horizontal orthogonal directions (here taken to correspond to the x- and y-axes of the Cartesian coordinate system shown in FIG. 1. Thus $E_x$, $E_y$, $H_x$ and $H_y$ are measured parameters that and can be used to determine the elements of the impedance tensor Z. The exploration-depth (i.e. the characteristic depth beneath the seafloor over which the subterranean resistivity contributes to the elements of the impedance tensor Z) is controlled principally by the electromagnetic skin depth ($\delta$) effect, which is frequency and resistivity dependent. Electromagnetic skin depth (in metres) may be approximated by the equation:

$$\delta = 500\sqrt{\frac{\rho}{f}}$$

Thus for relatively short periods (i.e. relatively high frequencies) the elements of the impedance tensor Z are most sensitive to the electrical properties of shallow structures. At longer periods (lower frequency) the impedance tensor is sensitive to greater depths in the earth. For example, for the uniform-background strata resistivities of 1 $\Omega$m for the model configurations shown in FIGS. 2A and 2B, the characteristic skin depth $\delta$ would be around 1000 m for a 0.25 Hz signal and around 1700 m for a 0.09 Hz signal.

The amplitudes of elements of the impedance tensor Z can be used to determine the apparent resistivity according to conventional MT analysis techniques. For example, for a one-dimensional (i.e. horizontally layered earth), the elements of the impedance tensor Z will be such that $Z_{xx}(\omega)=Z_{yy}(\omega)=0$, and $Z_{xy}(\omega)=Z_{yx}(\omega)$. In this case an apparent resistivity $\rho_a$ for the earth beneath the detector can be determined as follows $$\rho_a = \frac{|Z_{ij}(\omega)|^2}{\omega\mu}$$

Here $Z_{ij}$ is one of either $Z_{xy}$ or $Z_{yx}$ (in practice an average of apparent resistivity values determined from both may be used) and $\mu$ is a characteristic magnetic permeability assumed for the subterranean strata. The apparent resistivity $\rho_a$ is a characteristic measure of the average resistivity of the subterranean strata beneath the receiver in the region over which the technique is sensitive to (i.e. over the depth of exploration as controlled primarily by the frequency used and the true resistivity). The apparent resistivity may thus be viewed as a weighted-average resistivity over the penetration depth of the signals, or alternatively as the resistivity of a uniform half-space possessing the same impedance magnitude as the observed response. Thus the apparent resistivity $\rho_a$ is equal to the true resistivity of the subsurface if the subsurface consists of an electrically uniform and homogeneous half-space.

Phase of impedance ($\Phi$) is the phase lead of an observed horizontal electric field component over an observed perpendicular horizontal magnetic field component. The phase of impedance provides information on resistivity contrasts in the earth. In the case that the subsurface consists of an electrically uniform and homogeneous half-space, the impedance phase $\Phi$ is 45°. Phase impedance relates to the elements of the impedance tensor Z as follows (for a 1-D earth):

$$\Phi^{IMP} = \tan^{-1}\frac{\text{Im}(Z_{ij}(\omega))}{\text{Re}(Z_{ij}(\omega))}$$

where the operators Im and Re indicate the imaginary and real components of their arguments, and $Z_{ij}$ is again one of either $Z_{xy}$ or $Z_{yx}$.

Thus the data in the curves shown in FIGS. 3A and 3B and 4A and 4B allow an apparent resistivity ($\rho_a$) and a phase of impedance ($\phi^{IMP}$) to be determined as a function of source-receiver separation R.

Figure 6A:
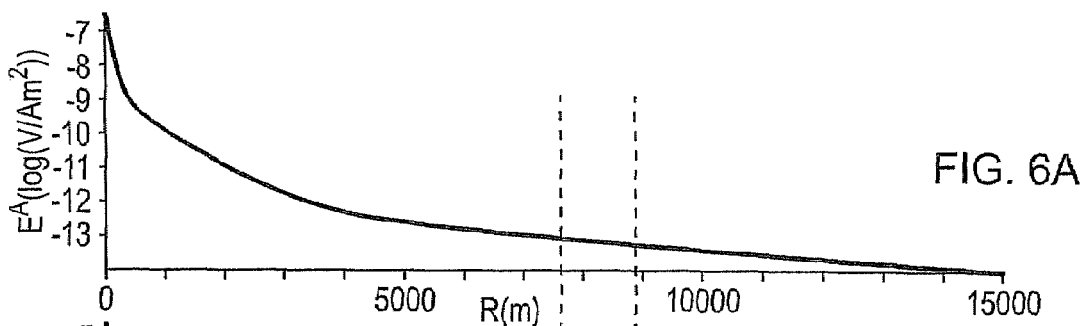
FIGS. 6A and 6B show plots which are identical to those shown in FIGS. 3A and 3B.
Figure 6B:
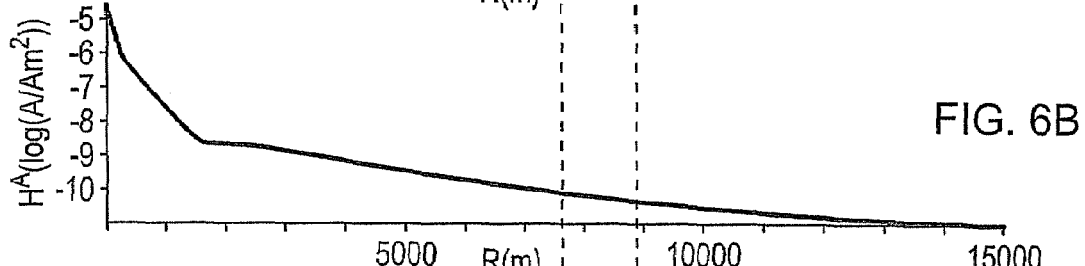

FIGS. 6A and 6B show plots which are identical to those shown in FIGS. 3A and 3B. That is to say FIGS. 6A and 6B respectively show the modelled electric ($E^A$) and magnetic ($H^A$) field amplitudes as a function of source-receiver offset (R) for the shallow-water uniform-background model configuration shown in FIG. 2A. The curves are duplicated for ease of comparison with the curve shown in FIG. 6C.

Figure 6C:
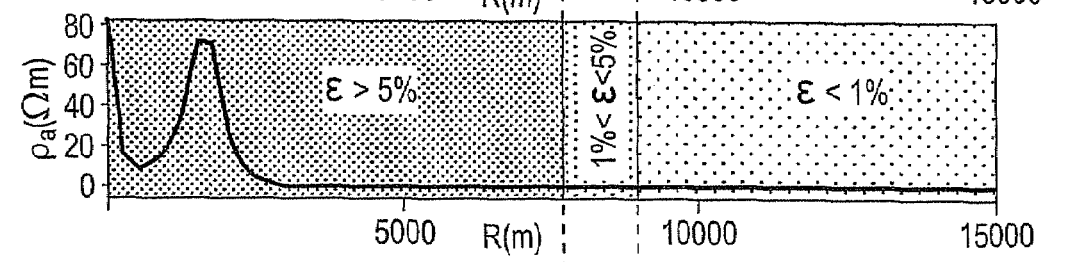
FIG. 6C is a graph schematically showing an apparent resistivity determined from the electric and magnetic field data shown in FIGS. 6A and 6B in accordance with MT analysis techniques.

FIG. 6C is a graph schematically showing the apparent resistivity ($\rho_a$) determined from the electric and magnetic field data shown in FIGS. 6A and 6B in accordance with MT analysis techniques, e.g. as discussed above. For source-receiver separations where the data are TE mode dominated (i.e. where the data are MT-like and the principles of MT analysis apply), the MT analysis technique should provide for a calculated apparent resistivity $\rho_a$ of 1 $\Omega$m. This is because 1 $\Omega$m is the true subterranean resistivity at all locations beneath the seafloor in the shallow-water uniform-background model used to synthesize the CSEM electromagnetic survey data. (Because the subterranean resistivity is 1 $\Omega$m at all locations, the calculated apparent resistivity $\rho_a$ for TE mode dominated data should approach 1 $\Omega$m irrespective of any exploration depth or sensitivity-weighting with depth considerations.) However, for source-receiver separations where the data are not TE mode dominated (i.e. where the data are not MT-like and the principles of MT analysis do not apply), the application of the MT analysis technique should provide for calculated apparent resistivities $\rho_a$ which are different from the true subterranean resistivity of the model. Thus the extent to which the data are TE mode dominated may be characterised by determining a percentage error $\epsilon$ between the calculated apparent resistivity $\rho_a$ according to MT theory and the known true subterranean resistivity of the model (1 $\Omega$m).

At source-receiver separations less than around 7700 m or so (i.e. to the left of the left-most dotted line in FIG. 6C) the percentage error $\epsilon$ between the calculated apparent resistivity $\rho_a$ and the true subterranean resistivity is greater than 5%. This indicates the MT analysis technique does not work properly for data in these regions of the graph. This is because the data here are not TE mode dominated. At source-receiver separations between around 7700 m and 8900 m (i.e. between the two dotted lines in FIG. 6C) the percentage error $\epsilon$ falls from around 5% to 1%. This indicates the MT analysis technique is starting to become more applicable (i.e. it is starting to give the "right" result). This is because the data here are staring to become more TE mode dominated in this region of the curve. At source-receiver separations greater than around 8900 m or so (i.e. to the right of the right-most dotted line in FIG. 6C) the percentage error $\epsilon$ between the calculated apparent resistivity $\rho_a$ and the true subterranean resistivity is less than 1%. This indicates the MT analysis technique works well in this model for source-receiver separations greater than around 9000 m. This is because the data here are TE mode dominated. FIG. 5B (which is based on the same model shallow-water uniform background model) also shows a switch from characteristically radial to characteristically vertical energy flows in the subterranean strata over the 7000 m to 9000 m or so range representing a move towards TE mode dominated data.

Figure 7A:
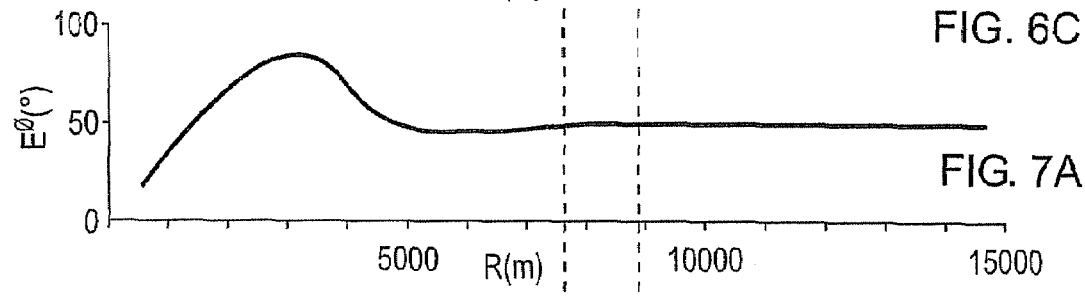
FIGS. 7A and 7B show plots which are identical to those shown in FIGS. 4A and 4B.
Figure 7B:
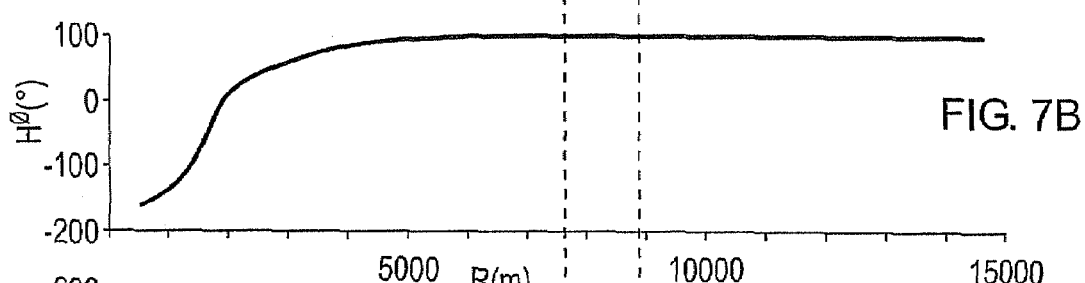

FIGS. 7A and 7B show plots which are identical to those shown in FIGS. 4A and 4B. That is to say FIGS. 7A and 7B respectively show the phases of the modelled electric ($E^\Phi$) and magnetic ($H^\Phi$) field amplitudes as a function of source-receiver offset (R) for the shallow-water uniform-background model configuration shown in FIG. 2A. The curves are duplicated for ease of comparison with the curve shown in FIG. 7C.

Figure 7C:
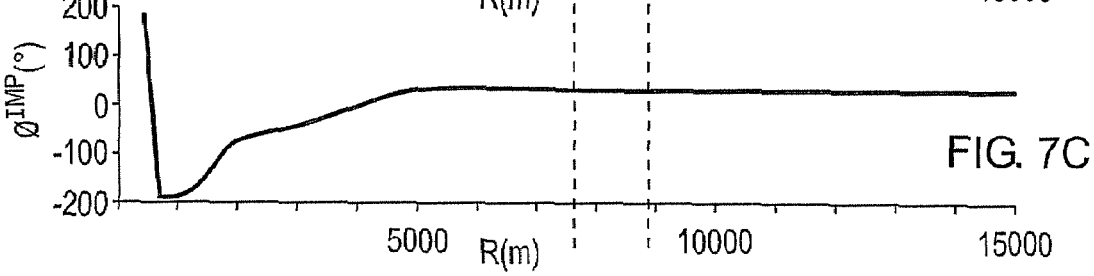
FIG. 7C is a graph schematically showing a phase impedance determined from the electric and magnetic field data shown in FIGS. 7A and 7B in accordance with MT analysis techniques.
Figure 8A:
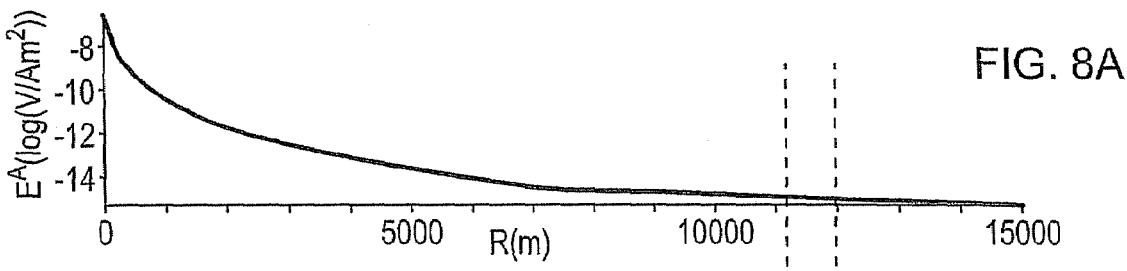
FIGS. 8A and 8B respectively show electric and magnetic field amplitudes as a function of source-receiver separation for a modelled CSEM survey for the model strata configuration shown in FIG. 2C.
Figure 8B:
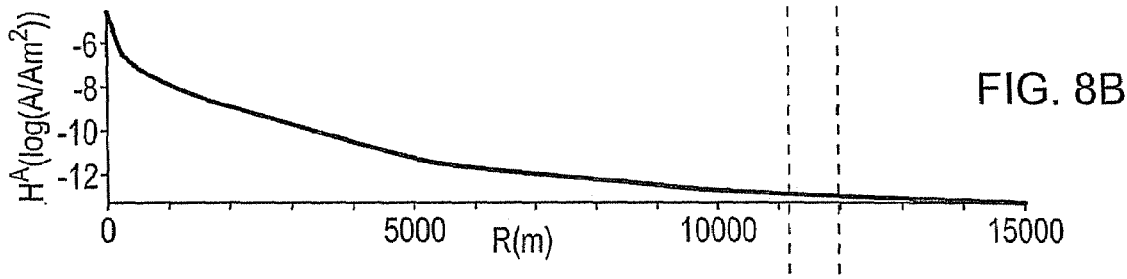
Figure 8C:
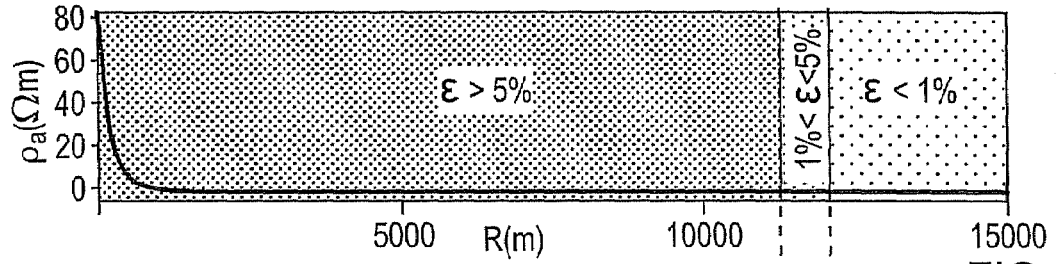
FIG. 8C is a graph schematically showing an apparent resistivity determined from the electric and magnetic field data shown in FIGS. 8A and 8B.
Figure 9A:
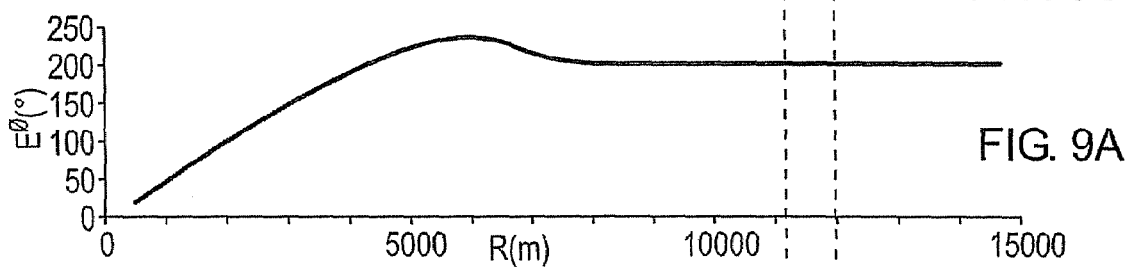
FIGS. 9A and 9B respectively show phases of the electric and magnetic fields whose amplitudes are shown in FIGS. 8A and 8B relative to the source signal.
Figure 9B:
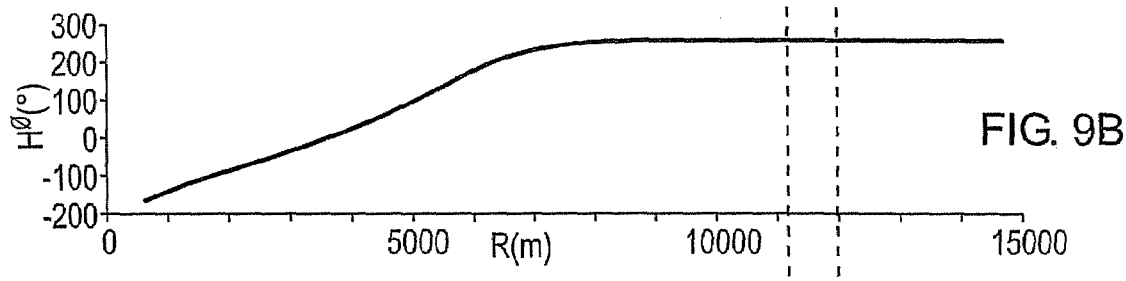
Figure 9C:
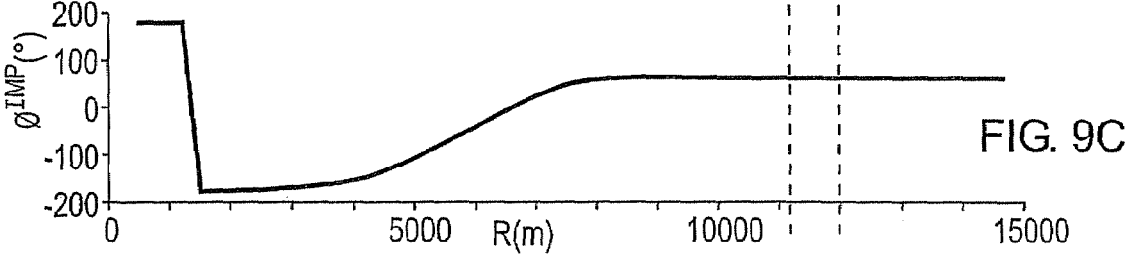
FIG. 9C is a graph schematically showing a phase impedance determined from the electric and magnetic field data shown in FIGS. 9A and 9B.

FIG. 7C is a graph schematically showing the phase of impedance $\phi^{IMP}$ determined from the electric and magnetic field data shown in FIGS. 7A and 7B in accordance with MT analysis techniques, e.g. as discussed above. For source-receiver separations where the data are TE mode dominated, the MT analysis technique should provide for a calculated phase of impedance $\phi^{IMP}$ of 45°. This is because this is the expected value for a subsurface consisting of an electrically uniform and homogeneous half-space, as in the model used here. However, as with the calculated apparent resistivity shown in FIG. 6C, for source-receiver separations where the data are not TE mode dominated the application of the MT analysis technique should provide for a calculated phase of impedance $\phi^{IMP}$ which is different from 45°. Thus the extent to which the data are TE mode dominated at different source-receiver separations may also be characterised by considering how close the phase of impedance $\phi^{IMP}$ is to the expected 45° for MT-like data. As with the calculated apparent resistivity shown in FIG. 6C, it can be seen that the calculated phase of impedance $\phi^{IMP}$ beings to approach the expected MT value of 45° between around 7000 m to 9000 m or so. This further confirms that for the model considered here, data obtained for source-receiver separations above around 9000 m are TE mode dominated (because analysing them in accordance with MT theory provides results close to those expected for the chosen model).

Accordingly, for a conventional inline CSEM survey there is a threshold offset above which data are primarily TE mode dominated. Data for source-receiver separations above this threshold offset have much reduced sensitivity to thin resistive or conductive layers in the subterranean strata, e.g. reduced sensitivity to a typical hydrocarbon reservoir. Thus these data may be analysed in accordance with conventional techniques (e.g. in accordance with MT theory) to determine characteristics of the large-scale background subterranean-strata in the area of the survey. This information can then assist in resolving the above-mentioned ambiguities that can arise when interpreting TM mode dominated CSEM data.

In a practical survey, the range over which MT-like data can be extracted for separate analysis to characterise the background subterranean strata is dependant on a number of parameters. For example, a suitable value to use as a threshold offset can depend both on features of the surveyed region (primarily water depth, but also characteristic subterranean resistivity and other subterranean parameters) and also the frequency of source signal component considered. An upper limit on the range over which MT-like data can be extracted will be set by the sensitivity of the receivers and the strength of the dipole source. This is because at larger offsets the detected signals become progressively weaker (see FIGS. 3A and 3B) and so a relatively strong (i.e. high-current or long-length) source and good receiver sensitivity may be required to provide a sufficient signal to noise ratio towards greater and greater source-receiver separations.

FIGS. 8A to 8C and 9A to 9C are similar to and will be understood from FIGS. 6A to 6C and 7A to 7C. However, FIGS. 8A to 8C and 9A to 9C are modelled for the deep-water uniform-background model configuration of FIG. 2C. Other parameters of the survey (e.g. source signal frequency content etc.) are the same as for the modelled results shown in FIGS. 6A to 6C and 7A to 7C. Thus the only difference between the models is in the water depth. As noted above, for the shallow-water uniform-background model (200-m water depth), the electromagnetic survey data begin to become primarily TE mode dominated for source-receiver offsets beyond around 9000 m or so. However, as can be seen from FIGS. 8A to 8C and 9A to 9C, for the deep-water uniform-background model (1000-m water depth), the electromagnetic survey data only begin to become primarily TE mode dominated at larger source-receiver offsets, for example beyond around 12000 m or so.

Thus by moving from 200-m water depth to 1000-m water depth the zone from which MT-like data may be extracted is pushed to further source-receiver separations by around 3000 m or so. Broadly speaking, the shallower the water depth, the shorter the source-receiver separation at which the MT-like data zone starts (for infinite water depth the inline CSEM data are not TE mode dominated at for any source-receiver separations).

The frequency content of the AC signal broadcast by the source also affects the threshold offset beyond which the CSEM data become predominantly MT-like (TE mode dominated). Generally speaking, the higher the frequency, the shorter the MT-like data zone starts.

Figure 10A:
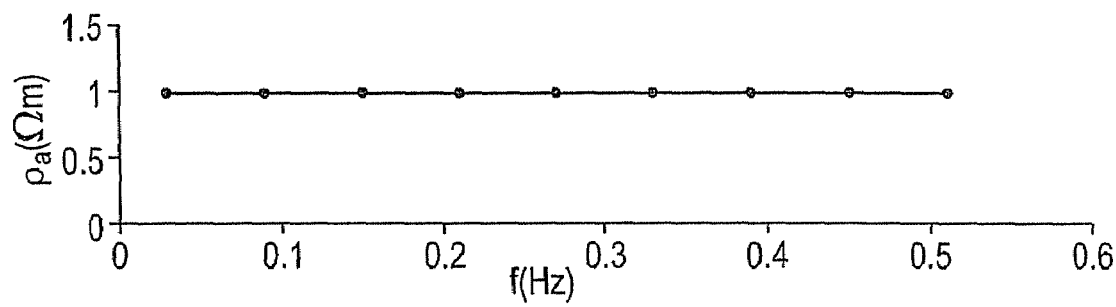
FIG. 10A is a graph schematically showing calculated apparent resistivity $\rho_a$ as a function of frequency f of a component in a transmitted signal from a dipole source for the model strata configuration shown in FIG. 2D.

FIG. 10A is a graph schematically showing calculated apparent resistivity $\rho_a$ as a function of frequency f of a component in a transmitted signal from the dipole source. The apparent resistivity $\rho_a$ is calculated generally as above, but for the shallow-water hydrocarbon-bearing model configuration of FIG. 2D. For each frequency the apparent resistivity is calculated for the greatest source-receiver separation for which the modelled data signal levels are above the expected seafloor noise level for typical CSEM receivers. Thus for each frequency the apparent resistivity $\rho_a$ is calculated as if for the data in the CSEM data set having the greatest source-receiver separation at which the recorded electromagnetic signals (which are generally weaker for higher frequencies) are still above the noise level. (These data may be considered as the most TE dominated of the useable data since the level of TE domination increases with increases separation.) The curve shown in FIG. 10A spans 0.03 Hz to 0.51 Hz. Apparent resistivity $\rho_a$ is calculated at 0.06 Hz intervals starting from 0.03 Hz. Accordingly the calculations are made at the principle frequency components that might be seen in a typical CSEM signal (e.g. from a square wave AC signal comprising a 0.03 Hz sinusoidal fundamental component and a series of odd harmonics thereof).

Figure 10B:
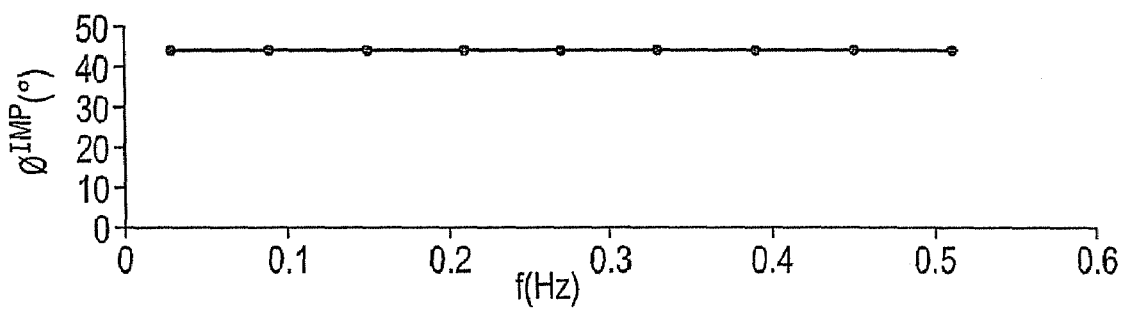
FIG. 10B is a graph schematically showing calculated phase of impedance $\phi^{IMP}$ as a function of frequency f of a component in a transmitted signal from a dipole source for the model strata configuration shown in FIG. 2D.

FIG. 10B is a graph which corresponds with the graph shown in FIG. 10A but schematically shows calculated phase of impedance $\phi^{IMP}$ (instead of calculated apparent resistivity $\rho_a$) as a function of frequency f of a component in a transmitted signal from the dipole source for the same model parameters.

It can be seen from FIG. 10A that the calculated apparent resistivity $\rho_a$ is close to 1 Ωm for each frequency, and it can be seen from FIG. 10B that the phase of impedance $\phi^{IMP}$ is close to 45° for each frequency. This indicates that above-noise level MT-like data are obtained all frequencies, and furthermore the calculated values for the apparent resistivity $\rho_a$ and the phase of impedance $\phi^{IMP}$ are close to those expected for a uniform background subterranean strata configuration having resistivity 1 Ωm. This demonstrates the MT-type data are insensitive to the presence or absence of the thin resistive hydrocarbon layer (as would be expected for conventional MT data). This is not the case for inline CSEM data which are not TE mode dominated.

Figure 11A:
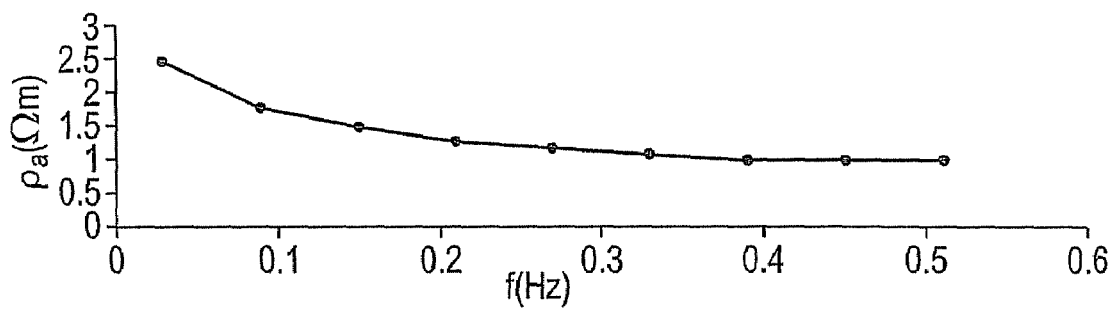
FIG. 11A is a graph schematically showing calculated apparent resistivity $\rho_a$ as a function of frequency f of a component in a transmitted signal from a dipole source for the model strata configuration shown in FIG. 2E.
Figure 11B:
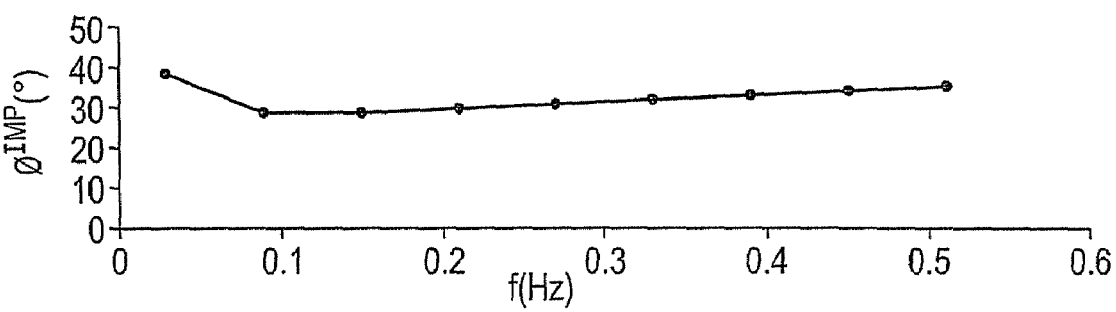
FIG. 11B is a graph schematically showing calculated phase of impedance $\phi^{IMP}$ as a function of frequency f of a component in a transmitted signal from a dipole source for the model strata configuration shown in FIG. 2E.

FIGS. 11A and 11B are similar to and will be understood from FIGS. 10A and 10B. However, whereas FIGS. 10A and 10B are determined for the shallow-water hydrocarbon-bearing model configuration of FIG. 2D, FIGS. 11A and 11B are determined for the shallow-water increasing-resistivity model configuration of FIG. 2E. As with FIGS. 10A and 10B, the curves in FIGS. 11A and 11B are calculated for the greatest source-receiver separation for which the modelled data signal levels are above the expected seafloor noise level for typical CSEM receivers. Since the water depth for FIGS. 11A and 11B is the same as for FIGS. 10A and 10B, and the water depth primarily determines the range at which the data become MT-like, it may be assumed that the data for the curves in FIGS. 11A and 11B are also TE mode dominated.

FIG. 11A shows the calculated apparent resistivity at the lowest end of the frequency range to be around 2.5 Ωm or so. This is for a frequency of 0.03 Hz. The characteristic penetration depth (skin depth) at this frequency for a subterranean strata having a uniform resistivity of around 1 Ωm would be on the order of 2500 m or so. Thus at the lower end of the frequency range the transmitted signals penetrate depths beyond that of the upper 500-m thick 1 Ωm layer, and into the higher resistivity layers beneath. The calculated apparent resistivity is thus a weighted average of the true model subterranean strata resistivity over a penetration range that includes the layers having higher resistivity in this model. An apparent resistivity value which is greater than the 1 Ωm seen in FIG. 10A at 0.03 Hz is seen in FIG. 11A because of the contribution of the deeper higher resistivity layers. This is similar to the responses that would be expected for conventional (i.e. naturally occurring) MT data.

At the higher end of the frequency range shown in FIG. 11A the calculated apparent resistivity is closer to 1 Ωm. The characteristic penetration depth (skin depth) at a frequency of around 0.5 Hz for a subterranean strata having a uniform resistivity of around 1 Ωm would be on the order of 700 m or so. Thus at the higher end of the frequency range the transmitted signals do not penetrate significantly beyond the upper 500-m thick 1 Ωm layer. The calculated apparent resistivity at this frequency is therefore close to the resistivity value of 1 Ωm for the upper layer.

The overall shape of the curve seen in FIG. 1A arises because the lower frequencies penetrate deeper into the earth and so the data at these frequencies are sensitive to deeper earth structures, which, for the model used for the FIG. 11A data, are more resistive than layers nearer to the seafloor. This demonstrates one way in which a subset of CSEM electromagnetic data (i.e. the long-offset TE-dominated MT-like data) can be used to distinguish between subterranean strata that are different on a large-scale, i.e. at a background strata level. I.e. it shows the MT-type data from source-receiver separations above an identified threshold offset are sensitive to, and can be used to constrain, variations in background structure.

(It is noted that phase in FIG. 11B is not close to 45° as the earth model is not uniform.)

Another characteristic of some subterranean strata which can be of significance is the extent to which the resistivity is anisotropic. For example, subterranean rock formations which so not include a hydrocarbon reservoir but which have significant degrees of vertically anisotropic conductivity (differing conductivity in the vertical and horizontal directions, i.e. so-called transverse anisotropy) can provide CSEM data which is similar to that seen when a hydrocarbon reservoir is present. This means a vertically anisotropic rock formation can potentially give rise to a false identification of hydrocarbon. Furthermore, in the event a vertically anisotropic (transverse anisotropic) rock formation does bear a hydrocarbon reservoir, the nature of the reservoir will be incorrectly determined if the background strata are wrongly taken to be isotropic. In particular, background anisotropy will generally lead to an underestimate of reservoir depth, and an over estimate of reservoir resistivity [7]. Thus a deep reservoir containing a relatively low fraction of hydrocarbon, and so of reduced economic interest, can be mistaken for what appears to be a commercially more interesting shallower reservoir with a higher hydrocarbon carbon (i.e., higher resistivity).

It can therefore be helpful if CSEM analysis techniques are sensitive to anisotropic resistivity in the subterranean strata. The TM coupling mode depends on both horizontal and vertical resistivity. This is why sole reliance on TM dominated cannot distinguish between the two resistivity values. However, as the MT-like data are primarily associated with only horizontal current flows, and hence are primarily sensitive to horizontal resistivity, analyzing the MT-like data in conjunction with the other CSEM data can help in constraining resistivity in both a vertical and a horizontal direction. (In the presence of general tri-axial anisotropy both TE and TM component fields are required to resolve the full 3D resistivity tensor.)

To demonstrate that inline CSEM MT-type data of the kind discussed above (i.e. long-offset data) can be used in conjunction with the shorter-offset more TM dominated data (i.e. data from source-receiver separations less than the threshold offset) to constrain electrical anisotropy, modelled data are obtained for the anisotropic shallow-water hydrocarbon-bearing model configuration shown in FIG. 2F. This is in essence the same model as shown in FIG. 2D save for the anisotropy of the large-scale background (i.e. the parts of the subterranean strata in which the target of interest is embedded).

Figure 12A:
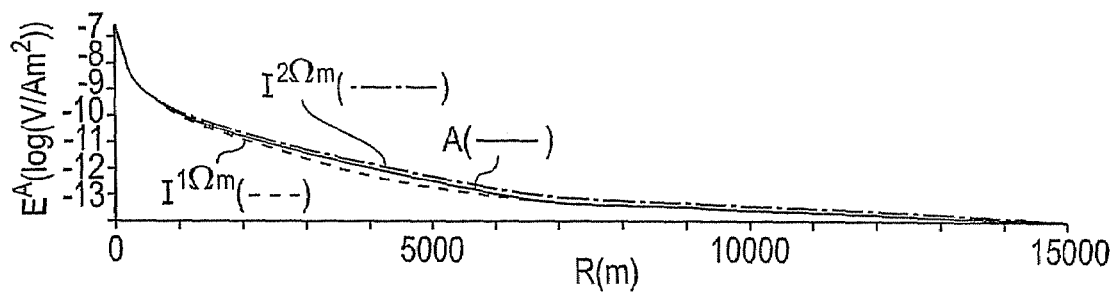
FIG. 12A is a graph which schematically shows electric field amplitudes as a function of source-receiver separation for other modelled CSEM surveys.

FIG. 12A is a graph in which the solid line (identified by legend A) schematically shows the modelled radial electric field component amplitude $E^A$ seen at a receiver in an inline orientation in response to an HED source broadcast signal as a function of separation R between the source and the receiver for the anisotropic shallow-water hydrocarbon-bearing model configuration shown in FIG. 2F. The HED source in this example is driven by an AC drive signal at a frequency of 0.25 Hz and the electric field is calculated in volts per meter at the receiver per unit transmitter electric dipole moment. Also shown in FIG. 12A for comparison are corresponding curves for models which are spatially the same as that shown in FIG. 2F, but having isotropic resistivity of 1 Ωm (dashed line marked $I^{1\Omega m}$) and 2 Ωm (dot-dashed line marked $I^{2\Omega m}$).

(It is noted the alternative isotropic model discusses here having an isotropic resistivity of 1 Ωm is thus the same as the model shown in FIG. 2D).

The model for the data shown in FIG. 12A is a shallow-water model and has subterranean resistivity values that are in the most part on the same order as those of the uniform-background model shown in FIG. 2A. Furthermore, the same source frequency is employed. As noted above, for the shallow-water uniform-background model shown in FIG. 2A, the CSEM data start to become MT-like beyond around 9000 m or so. This means data for the model shown in FIG. 2F and plotted in FIG. 12A can also be expected to start to become MT-like beyond around 9000 m or so. This is also apparent from the figure. Up to 9000 m or so the solid curve (anisotropic model) is different from either of the dashed and dot-dashed curves (isotropic models at 1 Ωm and 2 Ωm respectively). Thus the data for the anisotropic model are sensitive to both the horizontal and vertical resistivity values. However, beyond around 9000 m, i.e. where the data become TE mode dominated, the solid curve (anisotropic model) closely follows the dashed curve of the isotropic model having resistivity at 1 Ωm. This shows the anisotropic model data in this region is in effect insensitive to the vertical resistivity. I.e. the fact that vertical resistivity is 2 Ωm does not stop the curve in this MT-like data region from following the corresponding curve for the isotropic model having a resistivity which matches the horizontal resistivity of the anisotropic model.

Figure 12B:
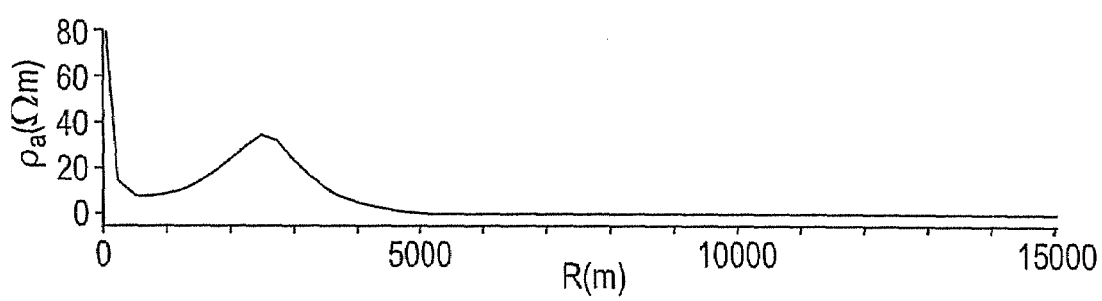
FIG. 12B is a graph schematically showing an apparent resistivity determined for one of the models used to provide the data in FIG. 12A.

FIG. 12B is a graph schematically showing the apparent resistivity ($\rho_a$) determined from the electric field data shown in FIG. 12A and the corresponding magnetic field data (not shown) in accordance with MT analysis techniques. Thus FIG. 12B is similar to and will be understood from FIG. 6C, save for the difference in model. As expected, in the MT-type data zone (separations >9000 m or so for this model) the apparent resistivity is close to 1 Ωm. This demonstrates that not only is MT-type data insensitive to the thin resistive hydrocarbon layer in the model (as previously demonstrated), it is also insensitive to vertical resistivity and provides information only on the horizontal resistivity in the anisotropic subterranean strata.

Figure 13A:
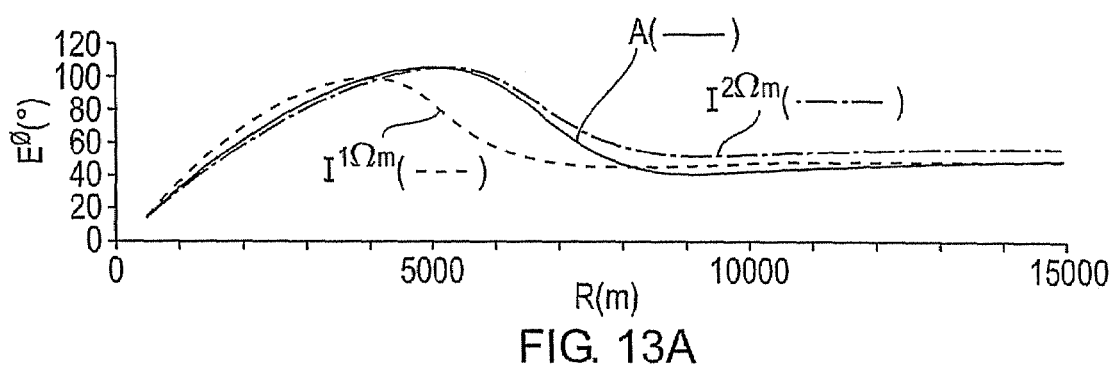
FIG. 13A is a graph which schematically shows phases of the electric fields whose amplitudes are shown in FIG. 12A.

FIG. 13A is a graph in which the solid line (identified by legend A) schematically shows the phase $E^\Phi$ of the modelled radial electric field component whose amplitude is plotted in FIG. 12A relative to the HED source AC drive signal. Also shown in FIG. 13A for comparison are corresponding curves for models which are spatially the same as that shown in FIG. 2F, but having isotropic resistivity of 1 Ωm (dashed line marked $I^{1\Omega m}$) and 2 Ωm (dot-dashed line marked $I^{2\Omega m}$).

Figure 13B:
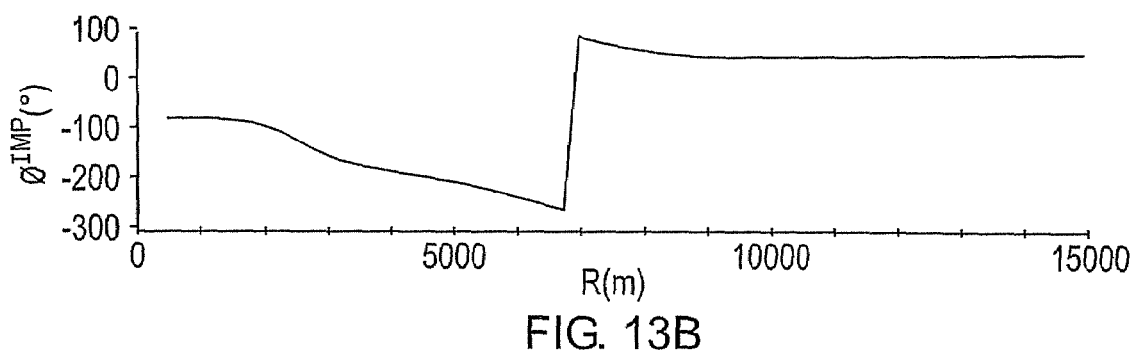
FIG. 13B is a graph schematically showing a phase impedance determined for one of the models used to provide the data in FIG. 13A.

FIG. 13B is a graph schematically showing the phase of impedance determined from the electric field data shown in FIG. 13A and the corresponding magnetic field data (not shown) in accordance with MT analysis techniques. Thus FIG. 13B is similar to and will be understood from FIG. 7C, save for the difference in model. The phase can be seen to approach 45° in the region of TE dominated data. This is the value expected for MT-like data for a uniform subterranean strata configuration. This therefore again demonstrates that the MT-type data are insensitive to both the model hydrocarbon layer and the anisotropy.

Thus a subset of data collected during a conventional inline CSEM survey can be identified (based on source-receiver separation) and considered as TE mode dominated MT-like data and used for constraining background structures in accordance with otherwise conventional CSEM/MT analysis schemes. This subset of the data can thus be used in place of the conventionally used TE mode data which has previously led to complications in collecting data for CSEM analysis as described above. By taking advantage of the long-offset (far-field) MT-like data from a conventional inline CSEM survey there is no need to modify either the source or receiver equipment. Furthermore there is no need to collect broadside data (although if such data are available it can still be used to augment the interpretation). Furthermore still, there is no need to acquire independent MT data (unless constraint of structure at depths to which CSEM data are not sensitive is desired).

Conventional CSEM data processing (e.g. known joint inversion algorithms [4], [8], [9]) can be used for the near-offset data (i.e. for source-receiver separations below a deemed threshold offset) to extract a parameter sensitive to the target structure of interest (e.g. a thin resistive (hydrocarbon) layer or a conductive layer). Another processing technique, e.g. conventional MT processing flow, can be applied to the data at source-receiver offsets greater than the threshold offset to obtain information on the subterranean strata background configuration (i.e. information on the strata not comprising a potential target). However, it should be noted that the conventional CSEM processing may include processing of data obtained for source-receiver separations both above and below than the threshold offset. That is to say, in some cases all data may be processed in accordance with conventional CSEM processing techniques, and not only the data from source-receiver separations less than the threshold offset.

Embodiments of the invention may be most applicable from extreme shallow water to medium range water depth environments. Because both TE dominated and TM dominated data sets can be collected at the same time there is a reduction of the time, and hence also cost, required to perform a survey. Furthermore, the use of the CSEM data to provide MT-like data means a better signal to noise ratio can be achieved than for natural MT data. Furthermore, MT type data are available in the same frequency band as CSEM data also. This provides a sensitivity to earth structure at the same scale for both the TE and the TM dominated data. For further signal-to-noise ratio improvement, it is possible to stack the MT-like data over a range of source-receiver offsets. The main advantages of embodiments of the invention may thus be summarised as follows:

- Conventional CSEM data and MT-like data may be collected at the same time using a conventional CSEM acquisition system. The MT-like data may be extracted and processed from the conventional CSEM data already acquired.
- Background and target structure can be investigated using simple tow geometry
- Horizontal and vertical resistivity in an anisotropic environment can be derived with a simple tow geometry
- MT-like data analysis occurs in the CSEM frequency band giving higher spatial resolution and sensitivity than with conventional natural MT data
- The complementary nature of the two data sets may be particularly well used when the amplitude and phase of the shorter range CSEM data are jointly inverted with the apparent resistivity and phase of the MT-like data. As mentioned above, the amplitude and phase of the longer-offset data (i.e. data from above the threshold offset) may also be included in the data processed in accordance with CSEM techniques.

A suitable threshold offset may be determined in a number of ways. For example, a threshold offset may be determined for use in a practical situation by using modelling to get an indication of the range at which the MT approximation is valid. This can be refined through analysis of the data at a range of source-receiver separations to identify regions where for a given frequency the apparent resistivity and phase of the MT impedance are approaching a constant value. This is because a lack of variation with offset in parameters determined from EM data is a characteristic feature of TE dominated data because the vertical direction of energy flow in the subterranean strata is largely the same regardless of offset. Thus a suitable threshold may be determined from the data itself, or a pre-determined threshold offset may be used, e.g. based on parameters of the survey and environment (e.g. source frequency, water depth), or based on previously obtained results from the region of interest.

One way of determining a suitable threshold separation/offset beyond which data may be considered as being TE mode dominated for a given survey based on the data itself will now be described with reference to FIGS. 14A to 14E.

Figure 14A:
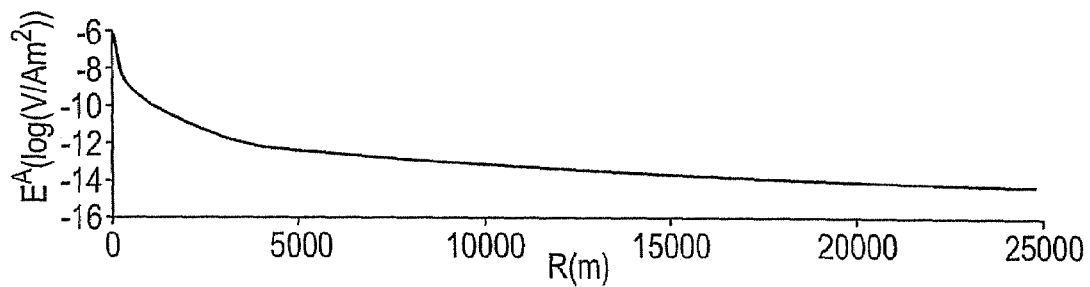
FIGS. 14A and 14B respectively show electric and magnetic field amplitudes as a function of source-receiver separation for a modelled CSEM survey.
Figure 14B:
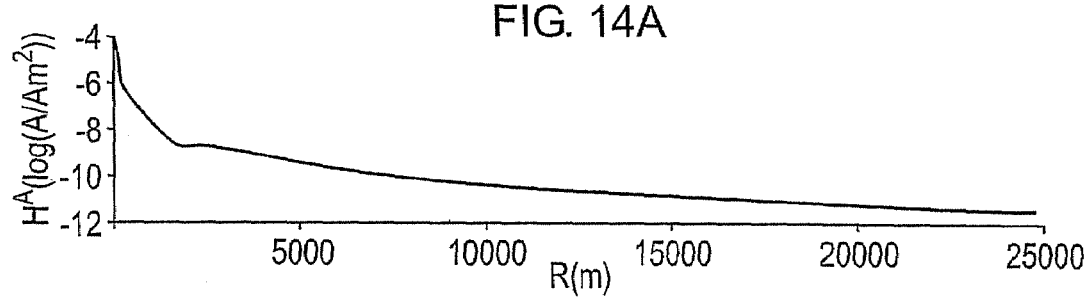
Figure 14C:
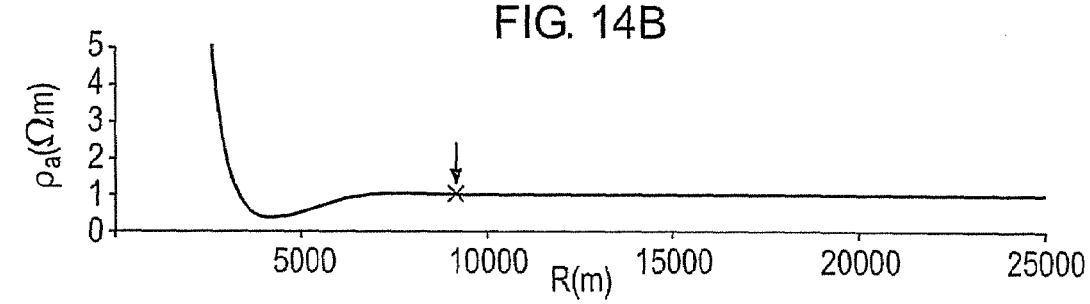
FIG. 14C is a graph schematically showing an apparent resistivity determined from the electric and magnetic field data shown in FIG. 14A.

FIGS. 14A, 14B and 14C are graphs schematically showing identical curves to those shown in FIGS. 6A, 6B and 6C, though on slightly different scales. Thus FIG. 14A shows the modelled electric field and FIG. 14B shows the modelled magnetic field for a 0.25 Hz source and the shallow-water uniform-background model in FIG. 2A. FIG. 14C shows the corresponding calculated apparent resistivity $\rho_a$ according to MT theory for the modelled EM data.

From FIG. 14C it can be seen that the apparent resistivity $\rho_a$ varies significantly in the region below around 7000 m. This variation in apparent resistivity $\rho_a$ as calculated in accordance with MT theory (i.e. assuming the data to be MT-like) with offset is indicative of the data not being very MT-like. I.e. the variation indicates the data are not TE dominated because the application of MT analysis techniques has led to a "wrong" result—i.e. it has led to a separation dependent apparent resistivity. However at source-receiver separations approaching 9000 m or so the apparent resistivity $\rho_a$ begins to settle down to a more steady level. Beyond around 9000 m the apparent resistivity $\rho_a$ becomes almost constant. This lack of variation with source-receiver separation is indicative of the CSEM data in this region being TE mode dominated and suitable for use in constraining parameters of the large-scale background subterranean strata. Thus a suitable threshold of 9000 m could be considered appropriate in this example (as indicated by the arrow and cross in FIG. 14C). This threshold offset is in the 1% to 5% regions of error between determined apparent resistivity and the known resistivity of the model indicated in FIG. 6C. It is noted that a suitable threshold value may thus be determined solely from the shape of the curve shown in FIG. 14C. There is therefore no need to "know" a priori the expected resistivity value of 1 $\Omega$m for this model to identify the region in which the calculated apparent resistivity $\rho_a$ matches that expected from an MT analysis of MT-like data.

One way of parameterising the variation in determined apparent resistivity $\rho_a$ with source-receiver offset is to determine its gradient. This kind of parameterisation can provide a systematic way of determining a suitable threshold offset from CSEM data.

Figure 14D:
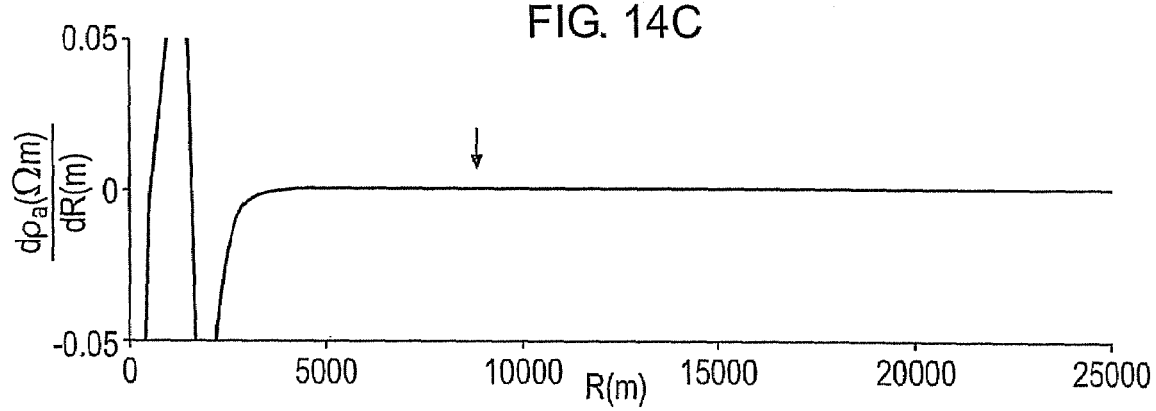
FIG. 14D is a graph schematically showing the gradient of the apparent resistivity versus separation shown in FIG. 14C.

FIG. 14D is a graph schematically showing the gradient $(d\rho_a/dR)$ of the apparent resistivity versus separation curve shown in FIG. 14C. This is very close to zero for separations on the order of 9000 m and higher, indicating no variation. Thus a suitable threshold offset may be defined as being the smallest source-receiver separation at which the gradient falls below a certain value. One way of doing this is to consider the percentage difference $\Delta$ between a calculated value of apparent resistivity $\rho_a$ and a neighbouring calculated value of apparent resistivity $\rho_a$.

Figure 14E:
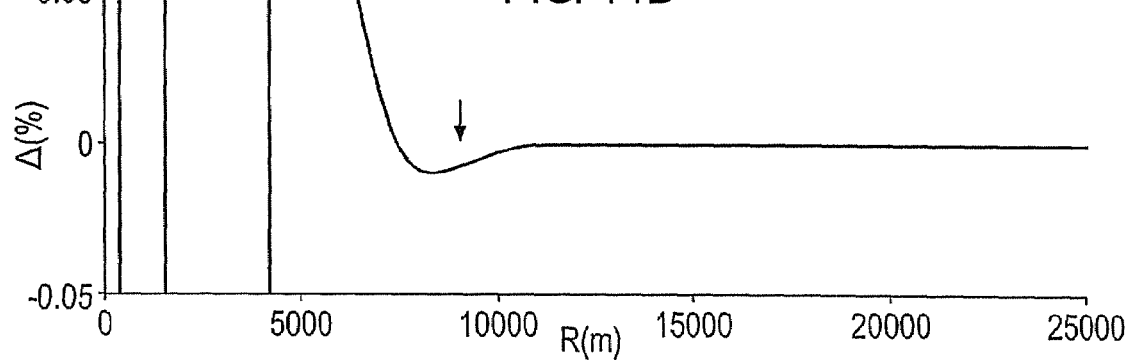
FIG. 14E is a graph schematically showing a percentage difference between apparent resistivity calculated at neighbouring source-receiver separation datums for the data shown in FIG. 14C.
Figure 15A:
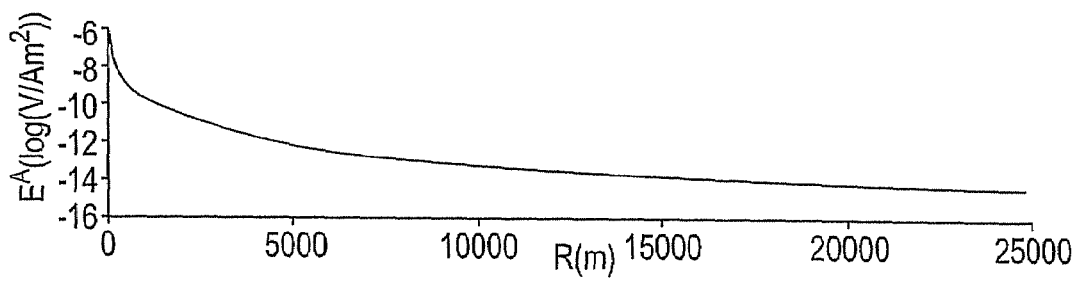
FIGS. 15A to 15E are similar to FIGS. 14A to 14E but show data for a different model frequency.
Figure 15B:
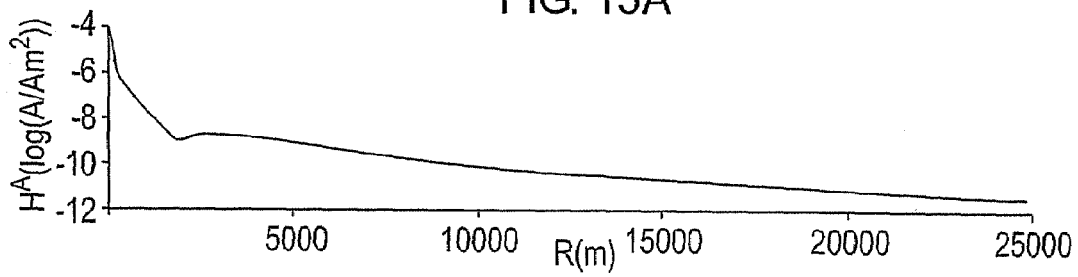
Figure 15C:
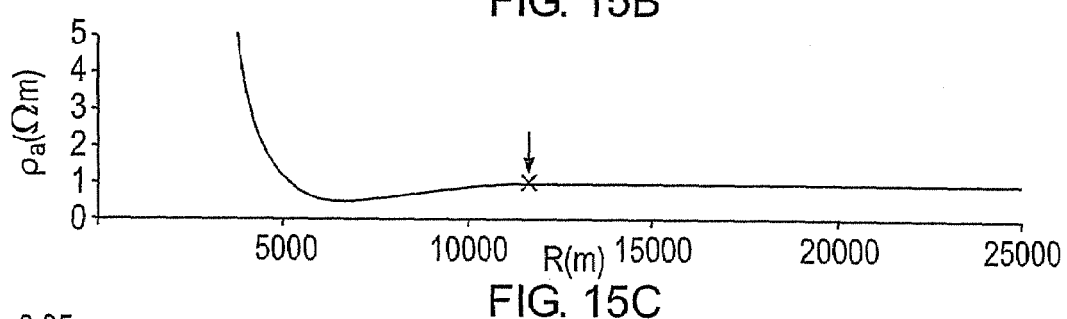
Figure 15D:
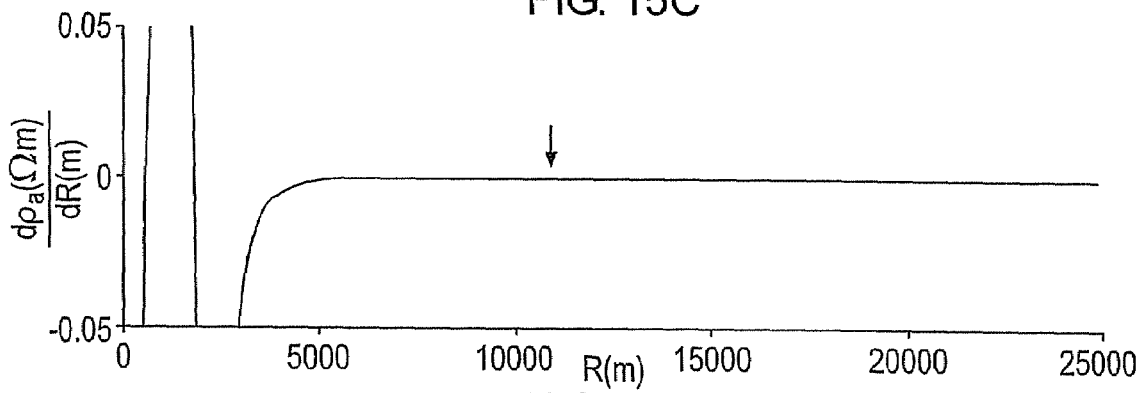
Figure 15E:
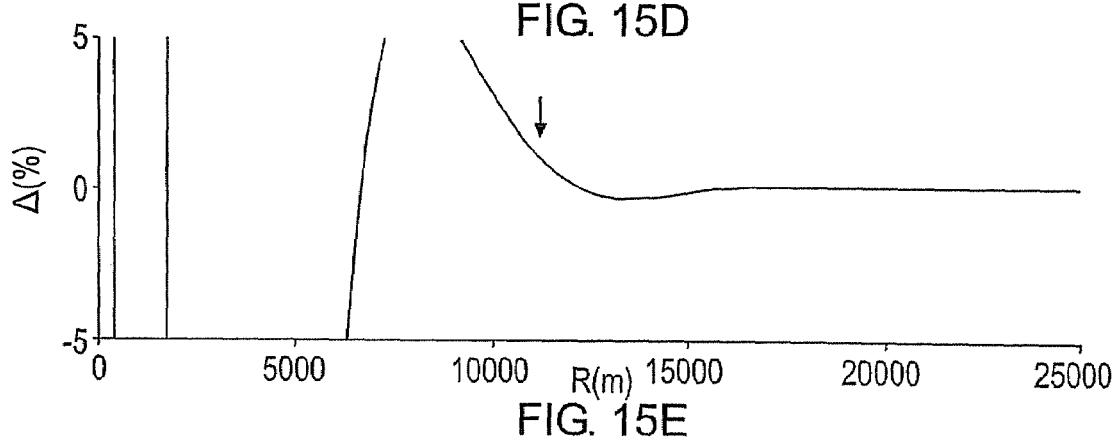

FIG. 14E is a graph schematically plotting the percentage difference $\Delta$ between a value of apparent resistivity calculated for one source-receiver separation compared to a value of apparent resistivity calculated for a neighbouring (here preceding) source-receiver separation for the data shown in FIG. 14C. Here neighbouring data points are separated by 250 m in source-receiver separation. This is a fairly typical binning resolution for CSEM data. The inventors have found that a suitable systematically determined threshold offset value may be the source-receiver separation at which the percentage difference Δ falls below a given value on the order of 1% or so, e.g. below 3%, 2.5%, 2%, 1.5%, 1% or 0.5% or so. (These example values are for a typical separation between neighbouring data points of 250 m—correspondingly scaled (up or down) values may be appropriate for other binning separations.) In FIG. 14E a threshold offset of 9000 m corresponds to a percentage difference Δ of a little under 1%. (It is noted from the curve in FIG. 14E that Δ might adopt a value lower than 1% at several places at shorter offsets than 9000 m as the curve swings between positive and negative. If necessary these "fast-crossings" can be readily identified as discounted as candidates for the threshold offset, e.g. based on the fact Δ does not remain below 1% (or other selected level) for any extended range of separations. For example, it could be required that Δ remains below the selected level for two, three or four neighbouring data points for example, e.g. corresponding to 500 m, 750 m or 1000 m or so, or more.)

FIGS. 15A to 15E are similar to and will be understood from FIGS. 14A to 14E. The curves in FIGS. 15A to 15E are calculated for same shallow-water uniform-background model as FIGS. 14A to 14E, but for a source signal component at 0.09 Hz. Thus the only difference between FIGS. 15A to 15E and FIGS. 14A to 14E is in the frequency of the source signal used to model the data. This demonstrates how the lower frequency leads to an increase in the source-receiver separation at which the data become TE mode dominated. For example, the above-described systematic approach to determining a suitable threshold offset with reference to FIG. 14E provides for a suitable threshold offset calculation of just over 11000 m or so for the lower frequency component (FIG. 15E) compared to 9000 m for the 0.25 Hz frequency component (FIG. 14E).

Figure 16A:
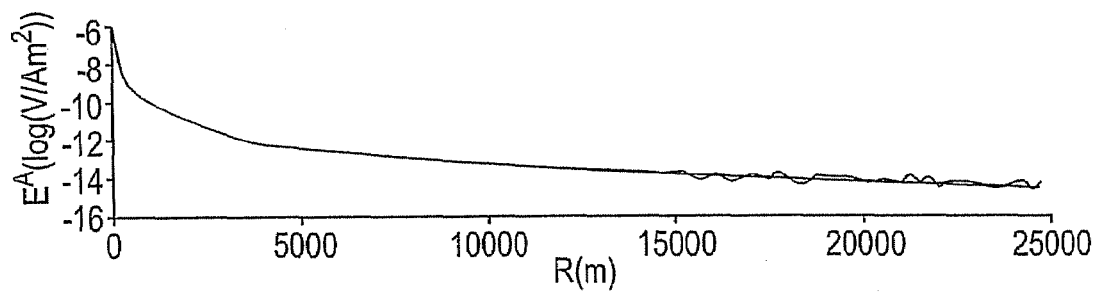
FIGS. 16A to 16D are similar to FIGS. 14A to 14C and 14E respectively, but also show model data including a random noise component.
Figure 16B:
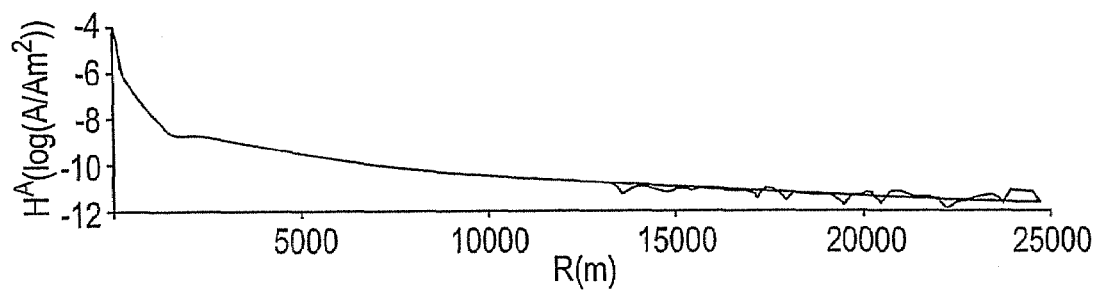
Figure 16C:
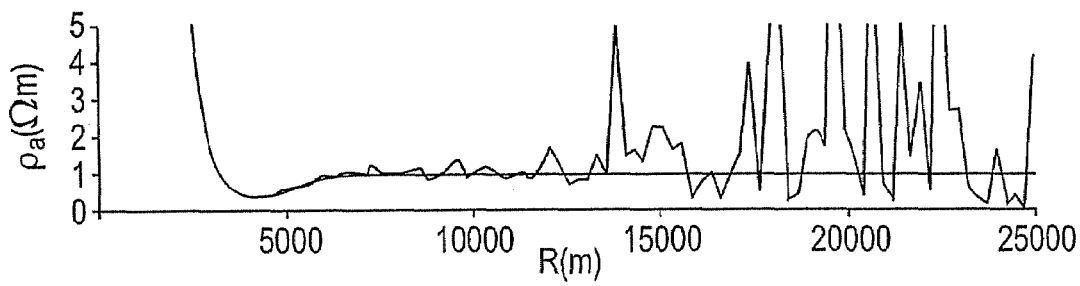

FIGS. 16A, 16B and 16C are graphs schematically showing identical curves to those shown in FIGS. 14A, 14B and 14C. However in addition to the curves shown in FIGS. 14A, 14B and 14C, each of FIGS. 16A, 16B and 16C also shows a corresponding curve which includes the effects of a random noise component in the data at the level that might typically seen in some CSEM surveys. This is to demonstrate how in some CSEM surveys the calculation of a suitable threshold offset may be done in a manner that takes noise into account. Thus FIG. 16A shows the modelled electric field for a 0.25 Hz source with the shallow-water uniform-background model without noise (the smoother of the two curves), and also the modelled electric field for a 0.25 Hz source with the shallow-water uniform-background model with randomly added noise (apparent as the more jagged curve). (The noise becomes more significant at longer offsets because of the reduced signal levels at these separations.) Similarly, FIG. 16B shows the modelled magnetic field for the same source and model both with and without noise. FIG. 14C shows the corresponding calculated apparent resistivity $\rho_a$ according to MT theory for the modelled EM data without noise as in FIG. 14C (the smother of the two curves) and with noise (the less-smooth of the curves in the figure).

Figure 16D:
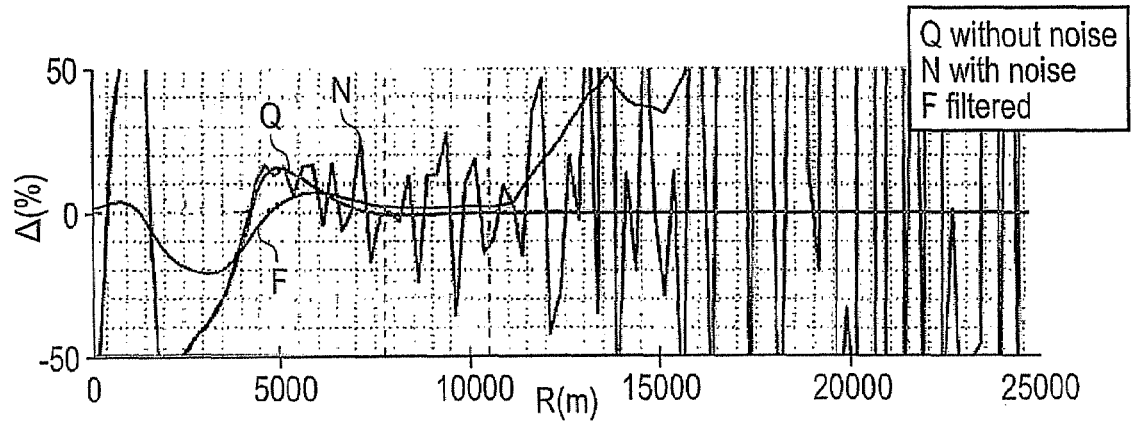

FIG. 16D shows an identical curve to that shown in FIG. 14E (although on a different scale). This is the curve marked Q in FIG. 16D and shows the percentage difference Δ between a value of apparent resistivity calculated for one source-receiver separation compared to a value of apparent resistivity calculated for a preceding source-receiver separation for the noise-free curve shown in FIG. 16D. Also shown in FIG. 16D are curves marked N and F. The curve marked N corresponds with the curve marked Q but is for the data with noise. Thus the curve marked N shows the percentage difference Δ between a value of apparent resistivity calculated for one source-receiver separation compared to a value of apparent resistivity calculated for a preceding source-receiver separation for the with-noise curve shown in FIG. 16D. It is clear that the noise causes significant variations in the calculated values for percentage difference Δ between measurements. This can make it difficult to identify a suitable source-receiver offset where percentage difference Δ falls below a given level taken to indicate the data are TE mode dominated. To address this in some cases it may be appropriate to filter the data when determining a threshold offset (to the extent the threshold offset is to be determined from the data). Thus the curve marked F in FIG. 16D corresponds with the curves marked Q and N, but is for the noisy data with filtering. Here the filtering (smoothing) is applied by calculating a simple moving "box-car" average of the percentage difference Δ. The smoothing here is applied over a window of around 1000 m or so. In other cases the smoothing may be applied at another stage of the analysis, e.g. to the apparent resistivity versus offset curves, or to the electric and magnetic field data curves.

In cases where the data are thought to be noisy, a suitable threshold offset may be the source-receiver separation at which the percentage difference Δ falls below a given value that is higher than might be used where the data are not noisy. For example, 3% may be appropriate for the curve F shown in FIG. 16D (compared to the 1% or so used for the curve shown in FIG. 14E). Although not readily apparent from FIG. 16D because of the scaling, the percentage difference Δ for the filtered curve F plateaus at a value below 3% at around 9000 m, which is around the same value as determined above with reference to FIG. 14E for the "noise-free" data example. It is noted that the mean value of apparent resistivity calculated in accordance with MT theory within this source-receiver separation region for the noisy data is around 1.042 Ωm. This is close to the "known" value for the model earth of 1 Ωm. This demonstrates how even with noisy data an MT-like subset of data may be identified.

It will be appreciated that for the purposes of analysis, particularly with noisy data, various conventional statistical tools may be applied. For example, deemed outlier data points may be discarded, and data from regions where the EM data are deemed too weak for reliable interpretation (e.g. because noise dominates the signals) may be discarded also. Thus an upper limit on the range of source-receiver separations taken to define the MT-like dominated data regime may also be defined. Furthermore data from a range of separations may be averaged to improve the statistical signal-to-noise ratio. This can be particularly advantageous for the MT-like data as there is no corresponding loss in spatial resolution because there is no spatial dependence to these data (to the extent they are truly MT dominated).

Figure 17A:
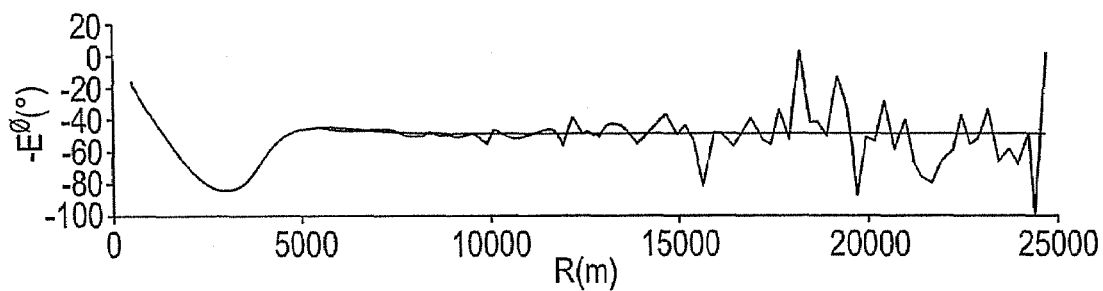
FIGS. 17A and 17B respectively show phases of the electric and magnetic fields whose amplitudes are shown in FIGS. 16A and 16B relative to the source signal.
Figure 17B:
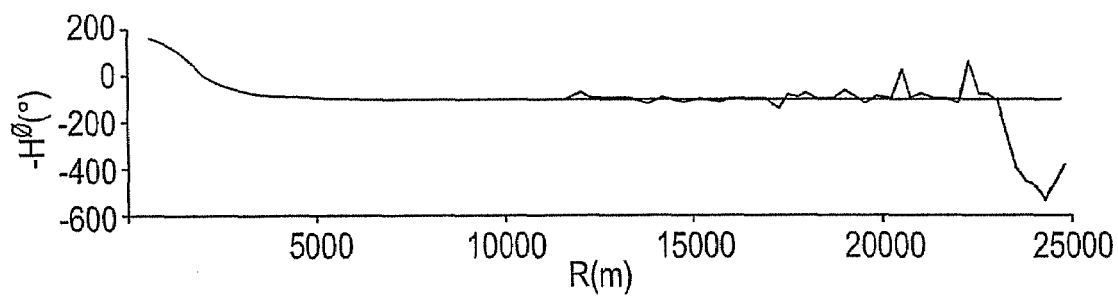
Figure 17C:
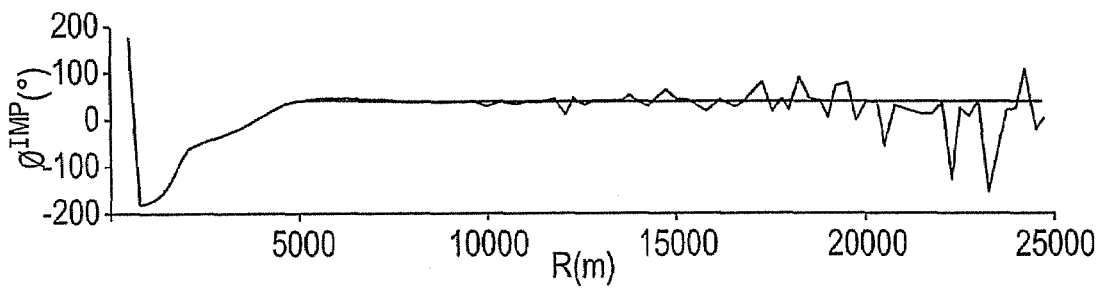
FIG. 17C is a graph schematically showing a phase impedance determined from the electric and magnetic field data shown in FIGS. 17A and 17B.
Figure 17D:
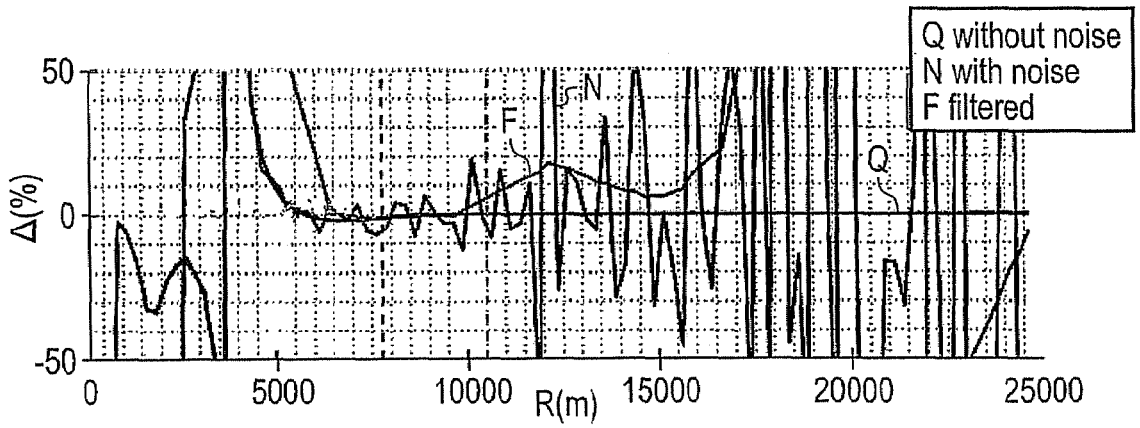
FIG. 17D is a graph schematically showing a percentage difference between phase impedance calculated at neighbouring source-receiver separation datums for the data shown in FIG. 17C.
Figure 18A:
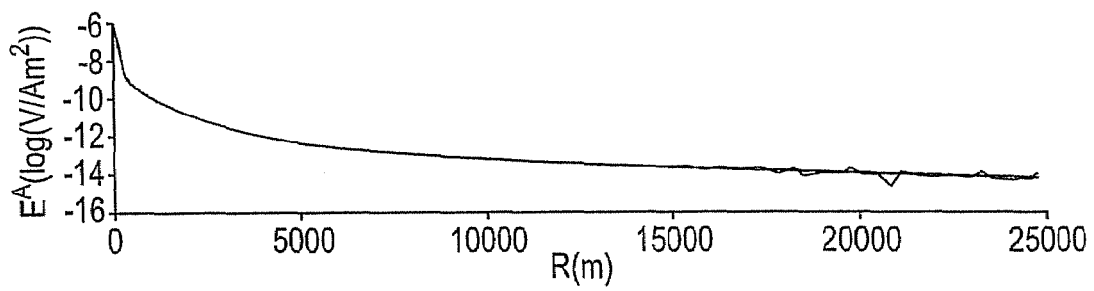
FIGS. 18A to 18D are similar to FIGS. 16A to 16D but show data for a different model frequency.
Figure 18B:
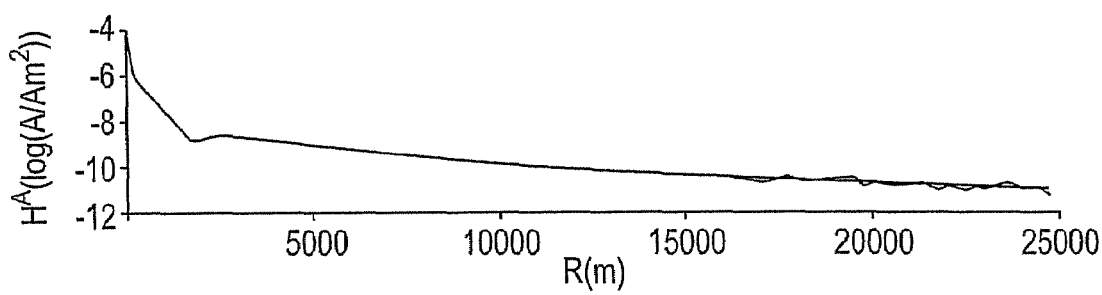
Figure 18C:
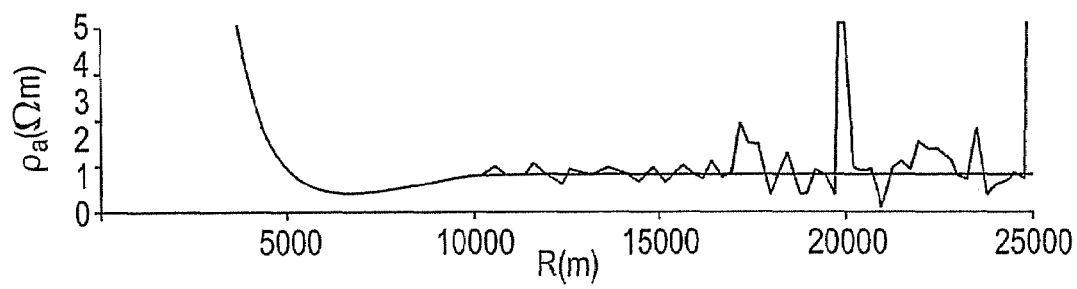
Figure 18D:
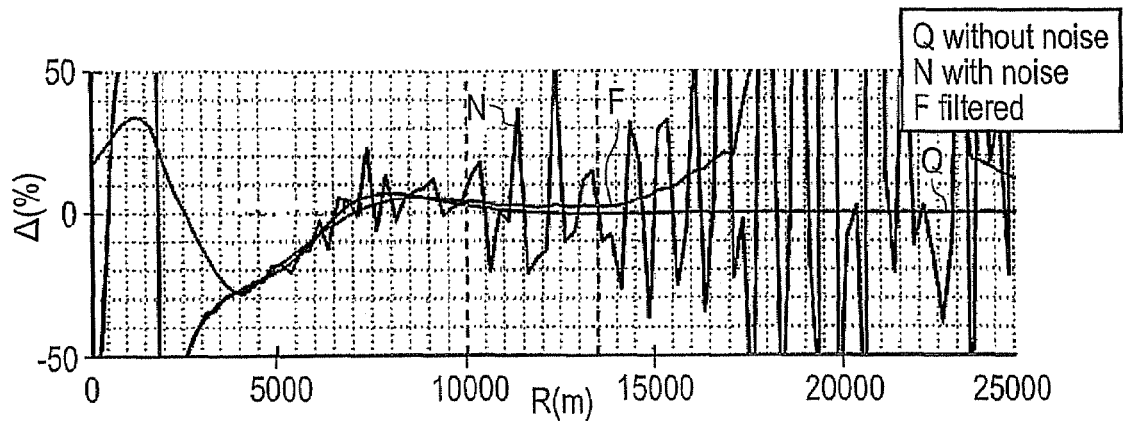
Figure 19A:
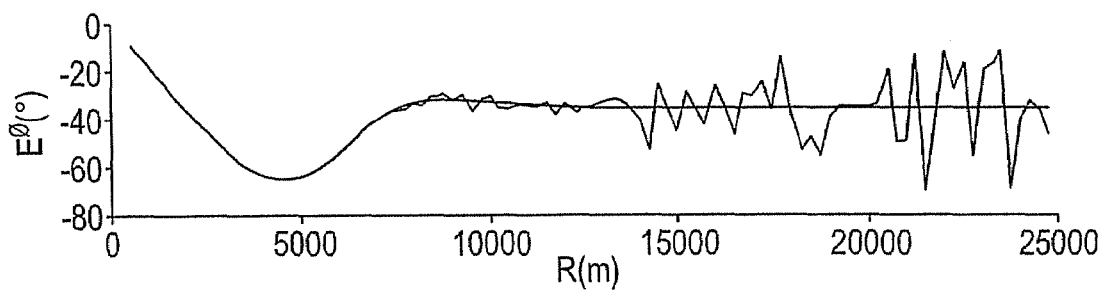
FIGS. 19A to 19D are similar to FIGS. 17A to 17D but show data for a different model frequency.
Figure 19B:
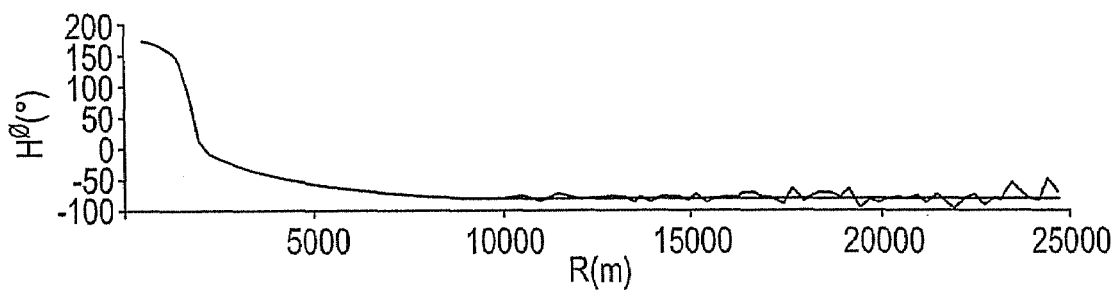
Figure 19C:
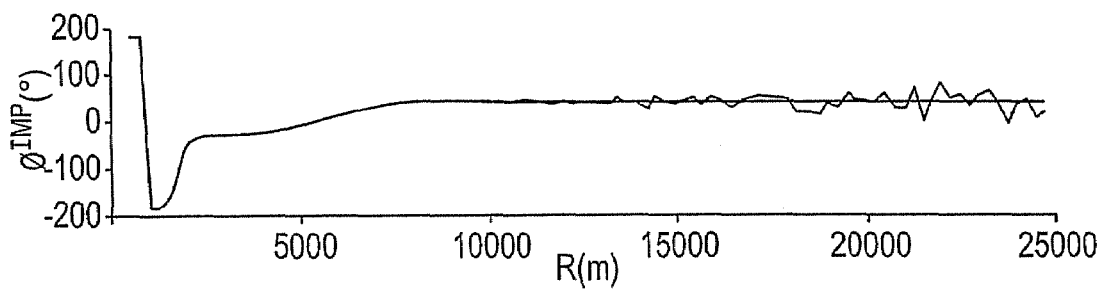
Figure 19D:
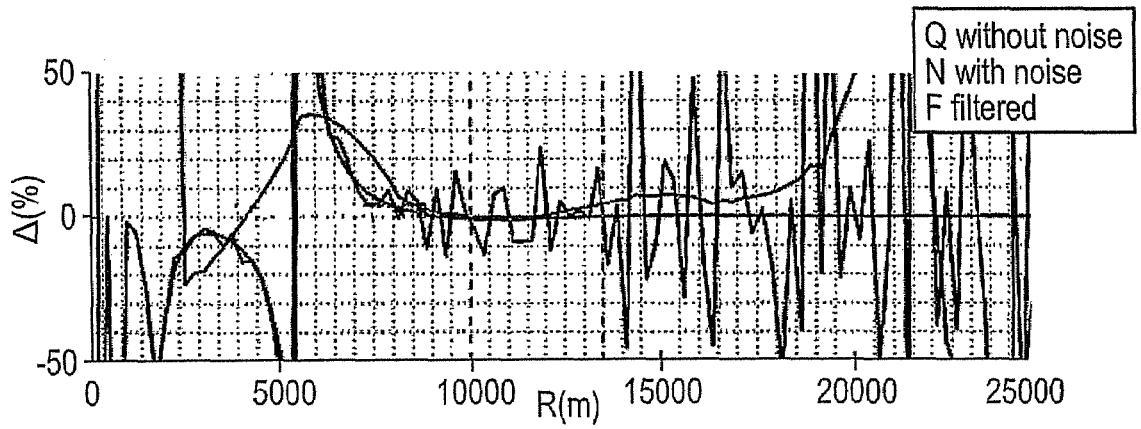

FIGS. 17A to 17D are similar to and will be understood from FIGS. 16A to 16D. However, whereas FIGS. 16A to 16D show the amplitudes of modelled electric and magnetic fields, and corresponding apparent resistivity and calculated percentage differences, FIGS. 17A to 17D show the corresponding curves based on phase. Thus FIGS. 17A to 17D each show two curves one with no noise (the smooth curves) and one with noise (the jagged curves). For the no-noise curves, FIGS. 17A to 17C show identical curves to those shown in FIGS. 7A, 7B and 7C, though again on slightly different scales. (It is noted that the curves in FIGS. 17A and 17B are inverted with respect to the curves in FIGS. 7A and 7B (i.e. the plotted parameters are $-E^{\Phi}$ and $-H^{\Phi}$), however this is not significant). The curves with noise show how the phase of impedance $\phi^{IMP}$ becomes progressively more noisy with increasing source-receiver separation.

FIG. 17D again shows the percentage difference $\Delta$ between a value of phase of impedance calculated for one source-receiver separation compared to a value of phase of impedance calculated for a neighbouring preceding source-receiver separation for the data shown in FIG. 17C. Again the neighbouring data points are separated by 250 m in source-receiver separation. As before curves are shown for noise free (marked Q), noisy (marked N) and filtered noisy (marked F) data. Again a plateau of low percentage difference around 9000 m or so indicates the data are becoming TE dominated in this region. These figures show that phase impedance may also be used as a characteristic parameter of the subterranean strata (as determined according to MT theory) and for which variations in which may be analysed to identify a suitable offset threshold. It is noted that the mean value of phase of impedance calculated in accordance with MT theory for the noisy data within the source-receiver separation region which is TE mode dominated is around 42.96°. This is close to the expected value of 45° for a uniform model earth.

FIGS. 18A to 18D and 19A to 19D are similar to and will be understood from FIGS. 16A to 16D and 17A to 17D respectively. The curves in FIGS. 18A to 18D and 19A to 19D are calculated for same shallow-water uniform-background model as FIGS. 16A to 16D and 17A to 17D, but are calculated for a source signal component at 0.09 Hz. Thus the only difference between FIGS. 18A to 18D and 19A to 19D, and FIGS. 16A to 16D and 17A to 17D, is in the frequency of the source signal used to model the data. This again demonstrates how the lower frequency leads to an increase in the source-receiver separation at which the data become TE mode dominated with plateau regions in the percentage difference corresponding to regions of reliable MT-like data being pushed out to greater source-receiver separations. It is noted that the mean values of apparent resistivity and phase of impedance calculated in accordance with MT theory for the noisy data within the source-receiver separation region which is TE mode dominated are around 1.036 $\Omega$m and 45.51° respectively. These values are again close to the "known" value for the model earth resistivity of 1 $\Omega$m and the expected phase of impedance value of 45° for a uniform model earth.

Another way of determining a suitable threshold offset from the data themselves is to rely on the fact that MT-type data should comprise primarily horizontal electric fields. Thus the ratio of measured vertical to measured horizontal electric fields at a detector is an indicator of to what extent the data are TE mode dominated (i.e. how much like MT-type data the CSEM data are). For example, for an inline CSEM data set an electric tipper parameter T may be defined as $T = E_z/E_x$, where $E_z$ is a measured vertical electric field component, and $E_x$ is a measured horizontal electric field component, here a radial component (i.e. the source dipole axis is taken to be aligned with the x-axis, as schematically shown in FIG. 1).

Figure 20A:
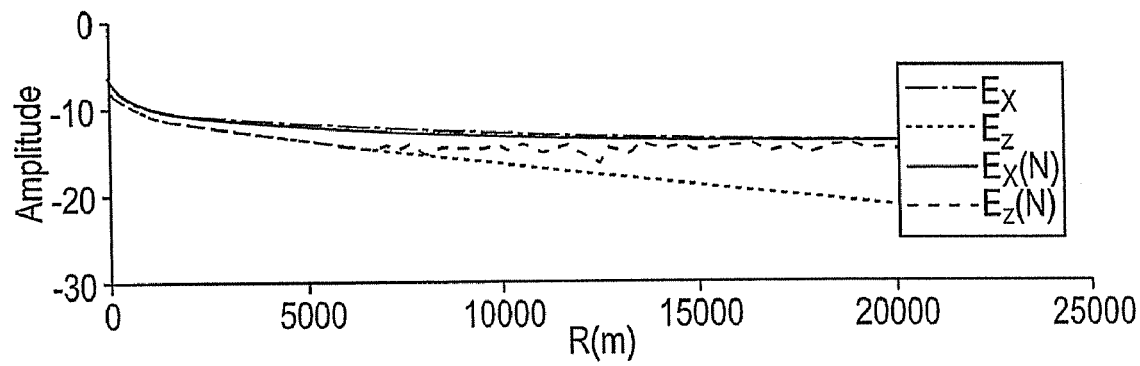
FIG. 20A schematically shows modelled radial and vertical electric field component amplitudes with and without noise seen as a function of source-receiver separation for a modelled CSEM survey for the model strata configuration shown in FIG. 2A.
Figure 20B:
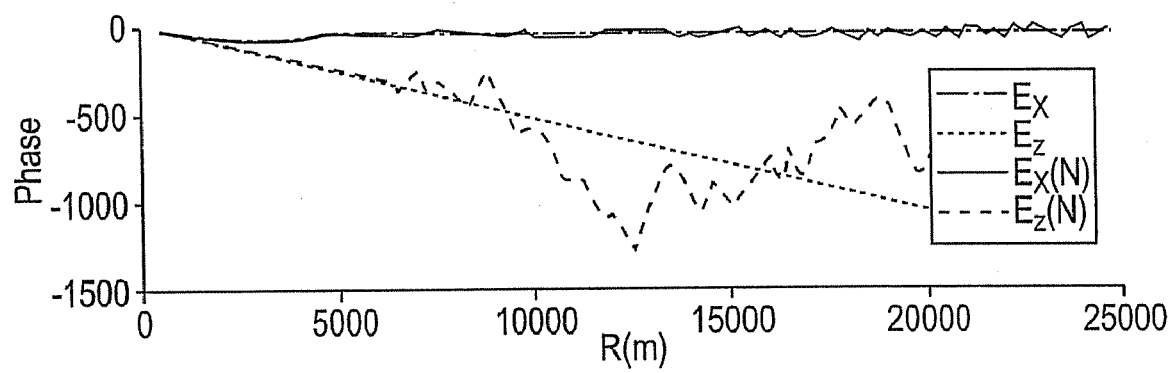
FIG. 20B schematically shows phases of the electric fields whose shown in FIG. 20A relative to the source signal.

FIG. 20A is a graph schematically showing the modelled radial ($E_x$) and vertical ($E_z$) electric field component amplitudes seen at a receiver in an inline orientation (i.e. $\theta=0$) in response to an HED source broadcast signal as a function of separation R between the source and the receiver for the shallow-water uniform-background model configuration shown in FIG. 2A. The HED source is driven by an AC drive signal at a frequency of 0.25 Hz and the electric fields are calculated in volts per meter at the receiver per unit transmitter electric dipole moment. The two solid curves show the horizontal electric field, with the smoother solid curve ($E_x$) corresponding to a noise-free model and the more jagged curve ($E_x(N)$) corresponding to a model including typical random noise. The two dashed curves show the vertical electric field component, again the smoother curve ($E_z$) corresponds to a noise-free model and the jagged curve ($E_z(N)$) corresponds to a model including typical random noise. It is clear from this figure that the vertical electric fields become progressively weaker relative to the horizontal electric fields with increasing source-receiver offset. This is indicative of the data becoming more TE-mode dominated (MT-like) at greater offsets. FIG. 20B shows the corresponding phases relative to the source signal of the curves shown in FIG. 20A.

Figure 21A:
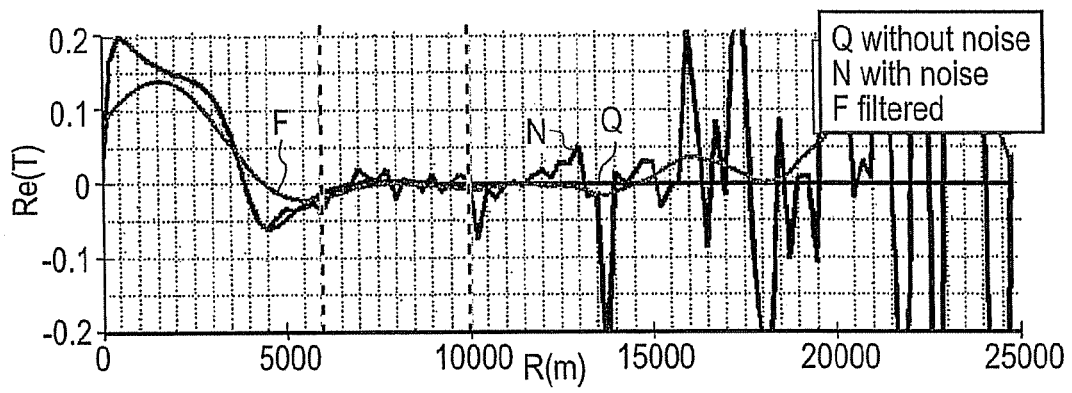
FIGS. 21A and 21B schematically show real and imaginary parts of an electric tipper parameter determined from the data shown in FIGS. 20A and 20B.
Figure 21B:
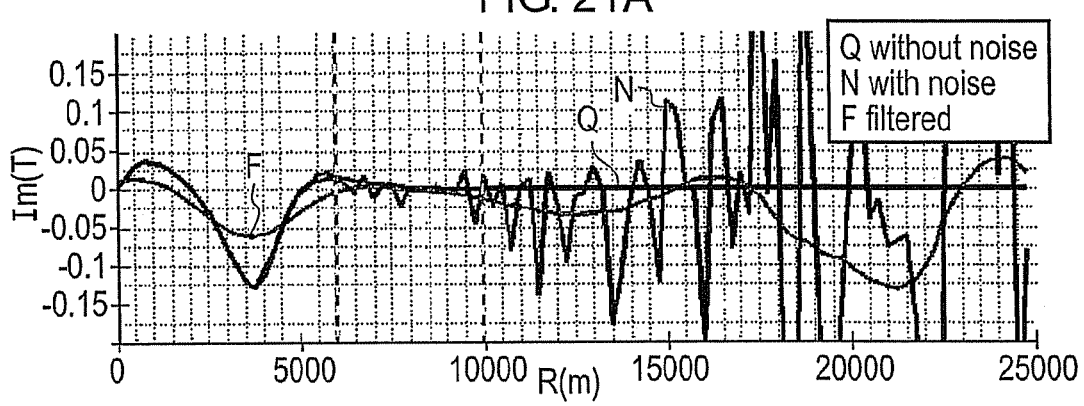

FIG. 21A shows curves marked Q and N respectively corresponding to the magnitude of the real part of the electric tipper (i.e. $E_z/E_x$) for the noise free and noisy modelled electric field data represented in FIGS. 20A and 20B respectively. Also shown in FIG. 21A is a curve marked F. This curve corresponds to the "with noise" N with filtering. Here, as with FIG. 16D, the filtering (smoothing) is applied by calculating a simple moving "box-car" average of the real part of the tipper (Re(T)). The smoothing here is again applied over a window of around 1000 m or so. FIG. 21B is similar to and will be understood from FIG. 21A, but shows corresponding curves for the magnitude of the imaginary part of the electric tipper (i.e. $E_z/E_x$). As can be seen from FIGS. 21A and 21B, the real and imaginary parts of the tipper both approaches 0 as R increases. Thus the tipper parameter can also be used to systematically define a suitable threshold offset in much the same way as described above for the parameter $\Delta$ corresponding to the percentage difference between a value of apparent resistivity calculated for one source-receiver separation compared to a value of apparent resistivity calculated for a neighbouring source-receiver separation. That is to say, a suitable threshold offset can be systematically defined according to the offset at which the tipper (e.g. its real or imaginary components) falls below a given level, e.g. below 0.03, 0.02, 0.01, for example. Both of FIGS. 21A and 21B show the electric tipper approaching 0 in the 9000 m offset region previously shown to be a suitable characteristic threshold offset in the vicinity of which the data become MT-like. Despite the difference in parameter plotted, the curves shown in both FIGS. 21A and 21B, and the way they can be used to help define a suitable threshold offset, are in general terms similar to, and will be understood from, the curves shown in FIG. 16C.

Figure 22A:
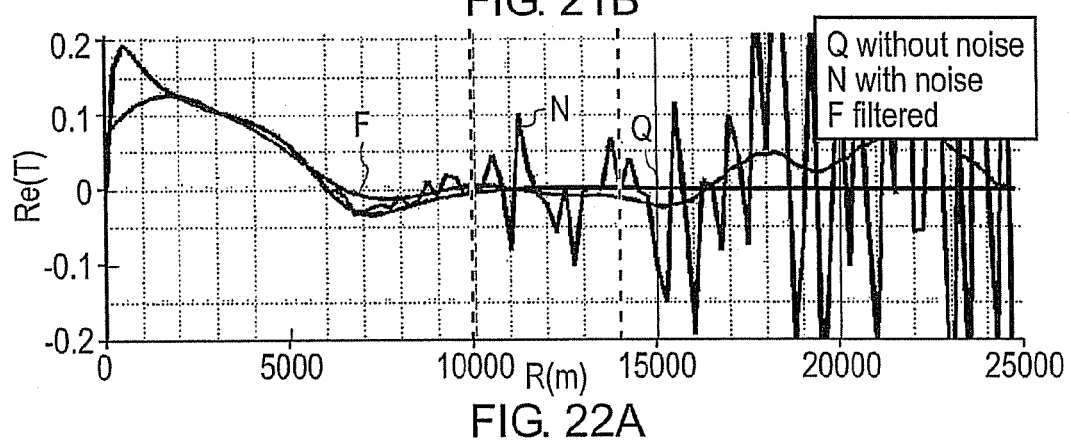
FIGS. 22A and 22B are similar to FIGS. 21A and 21B but show data for a different source-signal frequency.
Figure 22B:
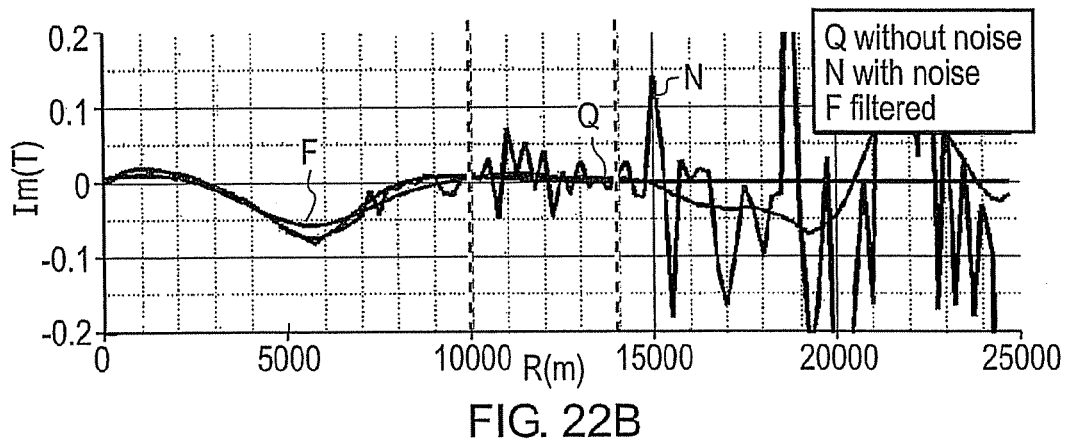

FIGS. 22A and 22B are similar to and will be understood from FIGS. 21A and 21B. The curves in FIGS. 22A and 22B are calculated for same shallow-water uniform-background model as FIGS. 21A and 21B, but are calculated for a source signal component at 0.09 Hz. Thus the only difference between FIGS. 21A and 21B and FIGS. 22A and 22B is in the frequency of the source signal used to model the data. The tipper (both real and imaginary) can be seen to tend towards 0 (indicating MT-like data) at greater offsets in FIGS. 22A and 22B, e.g. at offsets in the region of around 11000 m or so. This again demonstrates how the lower frequency leads to an increase in the source-receiver separation at which the data become TE mode dominated with plateau regions in the percentage difference corresponding to regions of reliable MT-like data being pushed out to greater source-receiver separations.

Thus it will be understood from the above that there are many ways in which a suitable threshold offset could be determined. Furthermore, it will be understood that in each case a characteristic offset distance will be obtained, and that although similar suitable threshold offsets can be expected to be determined using different techniques, in general there will be differences. This is because the move towards MT-like (TE dominated) data does not occur discretely at a specific offset, but evolves gradually over a distance of perhaps a 1000 m or so, or even higher. This means different ways of determining a suitable threshold offset will in general lead to different results, perhaps varying by a 1000 m or so. One approach therefore might be to determined suitable offsets using a range of techniques, and to take an average for example.

For the preceding models all data are for inline configurations. However, it will be understood that whilst an inline, or near in-line dataset may be considered preferable to have a TM mode dominated dataset (sensitive to thin layers), the TE mode data (MT-type) could be extracted from CSEM data for any source-receiver geometry. Nevertheless for the purpose of illustration it makes sense to use the CSEM receivers, which are in an inline configuration. In practice it would also make sense to use inline data for the MT-like data as this can be collected along with the TM data in a single tow.

Figure 23A:
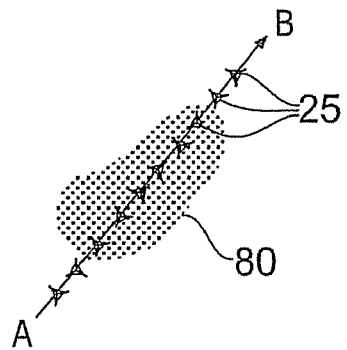
FIGS. 23A, 23B and 23C schematically show in plan view examples of methods of surveying for providing data for analysis according to embodiments of the invention.
Figure 23B:
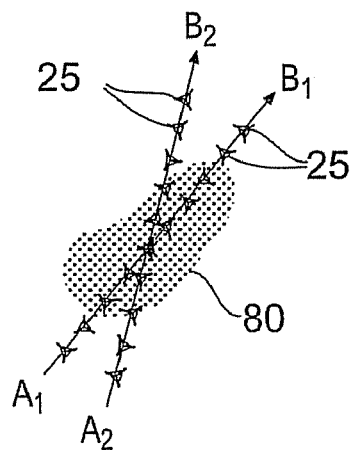
Figure 23C:
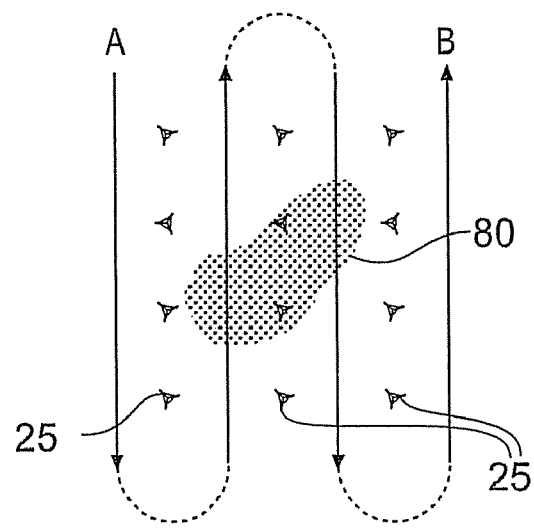

FIGS. 23A, 23B and 23C schematically show in plan view examples of methods of surveying for providing data for analysis according to embodiments of the invention. In each case the survey is made over an area of seafloor above a hydrocarbon reservoir 80.

FIG. 23A shows what might be referred to as a single-line survey. This relatively simple survey method might, for example, be appropriate for determining the content of a known prospect. For example to determine whether a previously identified subterranean geological structure contains resistive hydrocarbon or conductive seawater. In this case a simple resistive or non-resistive determination is all that is required and so a relatively simple survey may suffice. In FIG. 23A an array of receivers 25 (typically around 15 to 40 of them) are deployed along a line over the region of interest. A typical spacing of perhaps 200 m to 2000 m between neighbouring detectors may be used. A source, e.g. an HED transmitter as shown in FIG. 1, is towed in a pass over the detectors from A to B. Data from the detectors recorded during the tow may be mathematically resolved into radial electric and azimuthal magnetic field components (or other spatially orthogonal components) for different source-detector offsets presented during the survey. The data may then be analysed according to the above-described techniques.

FIG. 23B shows what might be referred to as a two-line survey. In FIG. 23B an array of receivers 25 are deployed along two lines over a region of interest. Each individual line array may be similar to the line array of FIG. 23A. A source is towed in two passes over the detectors, one pass from $A_1$ to $B_1$ and one pass from $A_2$ to $B_2$ (or in the opposite directions for either). Data from the detectors recorded during the tow may be mathematically resolved into radial electric and azimuthal magnetic field components for different source-detector offsets presented during the survey. The data may then be analysed according to the above-described techniques.

FIG. 23C shows another example survey method. Here receivers/detectors 25 are arrayed over the area of interest in a grid-like pattern. A source is towed to make repeated passes over the array of detectors along a path between A to B. This survey method provides comprehensive multi-geometry data. Although this example is based on a square receiver grid, it will be understood that a wide variety of receiver placements may be used. For example other high symmetry regular grids, such as triangular or rectangular, may be used. In addition irregular grids may be used that have no high level of symmetry.

Figure 24:
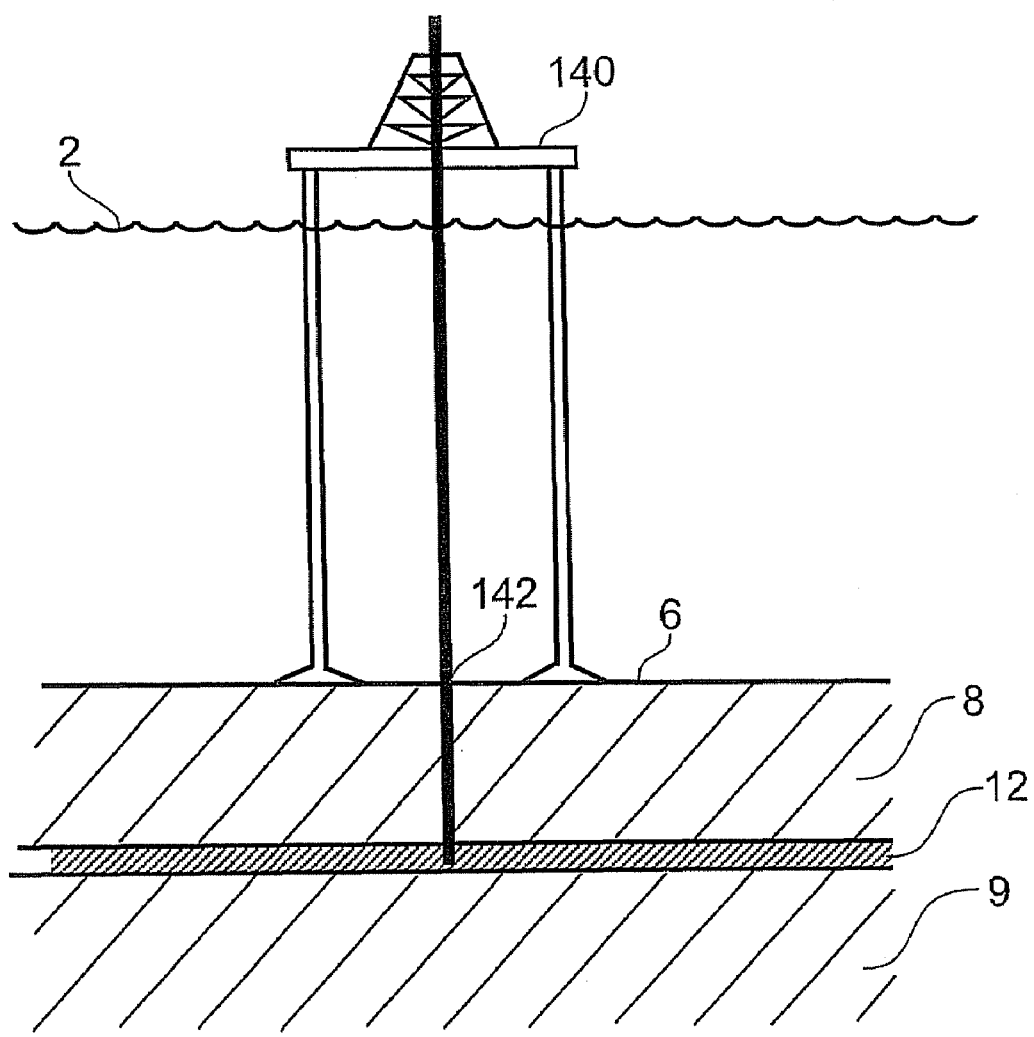
FIG. 24 is a schematic view of an oil rig producing hydrocarbon according to an embodiment of the invention.

FIG. 24 is a schematic view of an oil rig 140 producing hydrocarbon according to an embodiment of the invention. The oil rig is located in the vicinity of a region of interest which has been CSEM surveyed. Here an analysis of the data obtained during the survey in accordance with the above-described techniques has identified a subterranean hydrocarbon reservoir 12 within the region of interest. The identified hydrocarbon reservoir has been penetrated by a hydrocarbon-producing well 142 carried by the oil rig 140. Hydrocarbon (e.g. oil) may be produced from the well 142 (i.e. extracted/recovered from the reservoir 12) using conventional techniques.

Figure 25:
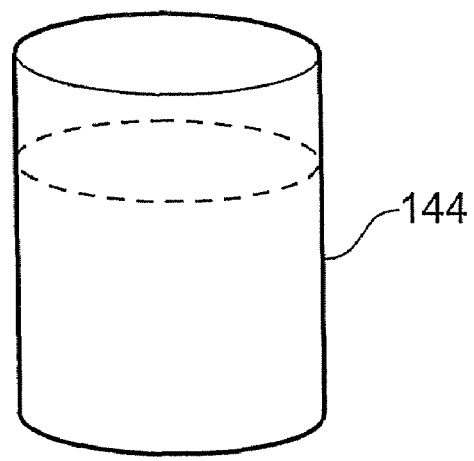
FIG. 25 is a schematic perspective view of a barrel containing a volume of hydrocarbon according to an embodiment of the invention.

FIG. 25 is a schematic perspective view of a barrel containing a volume of hydrocarbon 144 according to an embodiment of the invention. The hydrocarbon is produced using the well 142 shown in FIG. 24.

It will be understood that while the above description of analyzing CSEM survey data has focused on data obtained from a towed source (transmitter), this is by way of example only. The method would also be applicable to data collected with towed receivers, with or without the source being towed. The method would also be applicable in a fixed installation. For example, the method could be used to monitor changes to a hydrocarbon reservoir from which hydrocarbon is being drawn. In such cases it will be appropriate to employ one (or more) source(s) in fixed positions relative to a receiver array rather than undertake frequent towed surveys. The source(s) could be anchored to the seafloor or suspended from an oil-rig platform, for example. In other examples, the source(s) could be placed in a well or borehole, e.g. a geotechnical borehole.

Finally, it will be understood that the invention is equally applicable to surveying of freshwater, for example large lakes or estuaries, so that references to seafloor, seawater etc. should not be regarded as limiting and should be interpreted as covering lakebed, riverbed etc.

Thus there has been described a method of analysing results from an electromagnetic survey of an area that is thought or known to contain a subterranean resistive or conductive body within a background strata configuration is described. The method comprises providing a set of electromagnetic field data obtained using at least one electromagnetic receiver and at least one electromagnetic source for a range of source-receiver separations, e.g. providing conventional controlled-source electromagnetic survey data. A subset of the electromagnetic field data is identified that comprises data obtained for source-receiver separations greater than a selected threshold offset. The threshold offset is chosen so that data beyond this offset are characteristic of magnetotelluric data. Thus the subset of data is then processed in accordance with a first technique to obtain information on the background strata configuration. In processing only the data in a closed subset of data corresponding to source-receiver separations greater than a selected threshold offset in accordance with the first technique information can be obtained on the background strata configuration. Other electromagnetic field data obtained for source-receiver separations less than the threshold offset may then be processed in accordance with a second technique to obtain information on any subterranean resistive or conductive body within the background strata configuration.

REFERENCES

[1] GB 2 382 875 (University of Southampton).
[2] GB 2 411 006 (OHM Limited)
[3] GB 2 423 370 (OHM Limited)
[4] Constable, S. C. & Weiss, C., *Mapping Thin Resistors And Hydrocarbons With Marine EM Methods: Insights From 1-d Modelling*, Geophysics, volume 71, issue 2, pp. 43-51, March 2006

[5] Cagniard, L., *Basic Theory of the Magneto-Telluric Method of Geophysical Prospecting*, Geophysics, volume 18, issue 3, pp. 605-635, July 1963

[6] Vozoff, K., *The Magnetotelluric Method in the Exploration of Sedimentary Basins*, Geophysics, volume 37, issue 1, pp. 98-141, February 1972

[7] Tompkins, M. J., Weaver, R., MacGregor L. M., *Effects of Vertical Anisotropy on Marine Active Source Electromagnetic Data and Inversions*, EAGE 66th Conference & Exhibition, Paris, 7-10 June 2004

[8] De Groot-Hedlin, C. & Constable, S. C., *Inversion of Magnetotelluric Data for 2D Structure with Sharp Resistivity Contrasts*, Geophysics, volume 69, issue 1, pp. 78-86, January 2004

[9] MacGregor, L., & Sinha, M., *Use of Marine CSEM for Sub-Basalt Exploration*, Geophysical Prospecting, volume 48, pp, 1091-1106

What is claimed is:

1. A method of analysing results from an electromagnetic survey of an area that is thought or known to contain a subterranean resistive or conductive body within a background strata configuration, comprising:
providing a set of electromagnetic field data obtained using at least one electromagnetic receiver and at least one electromagnetic source for a range of source-receiver separations;
identifying a subset of the electromagnetic field data which comprises data obtained for source-receiver separations greater than a threshold offset;
processing the subset of the electromagnetic field data for source-receiver separations greater than the threshold offset in accordance with a first technique to obtain information on the background strata configuration; and
processing electromagnetic field data obtained for source-receiver separations less than the threshold offset in accordance with a second technique to obtain information on any subterranean resistive or conductive body within the background strata configuration.

2. A method according to claim 1, wherein the threshold offset is selected such that the identified subset of electromagnetic data comprises data dominated by a transverse electric (TE) mode of coupling between the source and the receiver.

3. A method according to claim 1, wherein the threshold offset is selected such that the identified subset of electromagnetic data comprises data dominated by a component of an electromagnetic signal from the source that has interacted with air.

4. A method according to claim 1, wherein the threshold offset is determined from an analysis of changes in the electromagnetic field data with source-receiver separation.

5. A method according to claim 4, wherein the analysis of changes in the electromagnetic field data with source-receiver separation comprises an analysis of rates of changes in the electromagnetic field data with source-receiver separation.

6. A method according to claim 4, wherein the analysis of changes in the electromagnetic field data with source-receiver separation comprises analysing the electromagnetic field data to obtain an estimated characteristic parameter of the background strata configuration, and determining the threshold offset based on a rate of change of the estimated characteristic parameter with source-receiver separation.

7. A method according to claim 6, further comprising applying a smoothing function to the estimated characteristic parameter to reduce to variations with source-receiver separation prior to determining the threshold offset.

8. A method according to claim 7, wherein applying the smoothing function comprises determining a moving average of the estimated characteristic parameter over a source-receiver separation averaging window.

9. A method according to claim 8, wherein the source-receiver separation averaging window has a width selected from the group comprising 100 m, 200 m, 300 m, 400 m, 500 m, 600 m, 700 m, 800 m, 900 m and 1000 m.

10. A method according to claim 6, wherein the threshold offset is taken to be the smallest source-receiver separation at which the rate of change of the characteristic parameter is less than a defined amount.

11. A method according to claim 10, wherein the defined amount is a percentage of a value of the characteristic parameter in the vicinity of each source-receiver separation, wherein the percentage is selected from the group comprising 3%, 2.5%, 2%, 1.5%, 1% and 0.5%.

12. A method according claim 6, wherein the estimated characteristic parameter corresponds to an estimated average subterranean resistivity value.

13. A method according to claim 6, wherein the estimated characteristic parameter corresponds to an estimated difference in phase between an electric component and a magnetic component of the electromagnetic field data.

14. A method according to claim 13, wherein the electric component and the magnetic component of the electromagnetic field data are field components along orthogonal directions.

15. A method according to claim 1, wherein the threshold offset is determined based on a comparison of a vertical component of electric field with a horizontal component of electric field.

16. A method according to claim 15, wherein the comparison of a vertical component of electric field with a horizontal component of electric field includes forming a ratio of relative strengths for the vertical and horizontal components, and determining a source-receiver separation at which this ratio falls below a predetermined threshold ratio value.

17. A method according to claim 16, wherein the predetermined threshold ratio value is selected from the group consisting of 0.03, 0.02 and 0.01.

18. A method according to claim 1, wherein the threshold offset is a separation selected from the group consisting of 5 km, 6 km, 7 km, 8 km, 9 km, 10 km, 11 km, 12 km, 13 km, 14 km and 15 km.

19. A method according to claim 1, wherein the source comprises a horizontal electric dipole (HED) transmitter, and the electromagnetic data comprise data obtained at locations in line with an axis of extent of the HED transmitter.

20. A method according to claim 1, further comprising processing electromagnetic field data obtained for source-receiver separations greater than the threshold offset in accordance with the second technique.

21. A method according to claim 1, wherein processing the subset of the electromagnetic field data in accordance with the first technique includes combining data from different source-receiver separations into a single datum.

22. A method according to claim 1, wherein the first technique is a magnetotelluric (MT) processing technique.

23. A method according to claim 1, wherein the second technique is a wavefield imaging processing technique.

24. A method according to claim 1, wherein the second technique is an inversion analysis processing technique.

25. A method according to claim 1, wherein the first technique is a wavefield imaging processing technique.

26. A method according to claim 1, wherein the first technique is an inversion analysis processing technique.

27. A computer readable media comprising instructions when executed by a processor to perform the following:

obtaining a set of electromagnetic field data obtained using at least one electromagnetic receiver and at least one electromagnetic source for a range of source-receiver separations;

identifying a subset of the electromagnetic field data which comprises data obtained for source-receiver separations greater than a threshold offset;

processing the subset of the electromagnetic field data for source-receiver separations greater than the threshold offset in accordance with a first technique to obtain information on the background strata configuration; and processing electromagnetic field data obtained for source-receiver separations less than the threshold offset in accordance with a second technique to obtain information on any subterranean resistive or conductive body within the background strata configuration.

28. A computer system comprising instructions when executed by a processor to perform the following:

obtaining a set of electromagnetic field data obtained using at least one electromagnetic receiver and at least one electromagnetic source for a range of source-receiver separations;

identifying a subset of the electromagnetic field data which comprises data obtained for source-receiver separations greater than a threshold offset;

processing the subset of the electromagnetic field data for source-receiver separations greater than the threshold offset in accordance with a first technique to obtain information on the background strata configuration; and processing electromagnetic field data obtained for source-receiver separations less than the threshold offset in accordance with a second technique to obtain information on any subterranean resistive or conductive body within the background strata configuration.

29. A method of planning an electromagnetic survey of an area that is thought or known to contain a subterranean resistive or conductive body within a background strata configuration, comprising:

creating a model of the area to be surveyed including a rock formation comprising the background strata configuration containing a postulated resistive or conductive body, and a body of water above the rock formation;

setting values for water depth, depth of the postulated resistive or conductive body, and resistivity structure of the rock formation;

performing a simulation of an electromagnetic survey in the model of the survey area by calculating horizontal electric and magnetic field data obtained by at least one simulated electromagnetic receiver detecting signals from at least one simulated electromagnetic source for a range of source-receiver separations;

identifying a subset of the electromagnetic field data which comprises data obtained for source-receiver separations greater than a threshold offset;

processing the subset of the electromagnetic field data for source-receiver separations greater than the threshold offset in accordance with a first technique to obtain information on the background strata configuration; and processing electromagnetic field data obtained for source-receiver separations less than the threshold offset in accordance with a second technique to obtain information on the postulated resistive or conductive body.

30. A computer readable media comprising instructions when executed by a processor to perform the following:

creating a model of the area to be surveyed including a rock formation comprising the background strata configuration containing a postulated resistive or conductive body, and a body of water above the rock formation;

setting values for water depth, depth of the postulated resistive or conductive body, and resistivity structure of the rock formation;

performing a simulation of an electromagnetic survey in the model of the survey area by calculating horizontal electric and magnetic field data obtained by at least one simulated electromagnetic receiver detecting signals from at least one simulated electromagnetic source for a range of source-receiver separations;

identifying a subset of the electromagnetic field data which comprises data obtained for source-receiver separations greater than a threshold offset;

processing the subset of the electromagnetic field data for source-receiver separations greater than the threshold offset in accordance with a first technique to obtain information on the background strata configuration; and processing electromagnetic field data obtained for source-receiver separations less than the threshold offset in accordance with a second technique to obtain information on the postulated resistive or conductive body.

31. A computer system comprising instructions when executed by a processor to perform the following:

creating a model of the area to be surveyed including a rock formation comprising the background strata configuration containing a postulated resistive or conductive body, and a body of water above the rock formation;

setting values for water depth, depth of the postulated resistive or conductive body, and resistivity structure of the rock formation;

performing a simulation of an electromagnetic survey in the model of the survey area by calculating horizontal electric and magnetic field data obtained by at least one simulated electromagnetic receiver detecting signals from at least one simulated electromagnetic source for a range of source-receiver separations;

identifying a subset of the electromagnetic field data which comprises data obtained for source-receiver separations greater than a threshold offset;

processing the subset of the electromagnetic field data for source-receiver separations greater than the threshold offset in accordance with a first technique to obtain information on the background strata configuration; and processing electromagnetic field data obtained for source-receiver separations less than the threshold offset in accordance with a second technique to obtain information on the postulated resistive or conductive body.

32. A method of performing an underwater electromagnetic survey of an area that is thought or known to contain a subterranean resistive or conductive body within a background strata configuration, comprising:

providing at least one electromagnetic source and at least one electromagnetic receiver for transmission and detection of electromagnetic signals;

obtaining a set of electromagnetic field data from the at least one electromagnetic receiver and at least one electromagnetic source for a range of source-receiver separations;

identifying a subset of the electromagnetic field data which comprises data obtained for source-receiver separations greater than a threshold offset;

processing the subset of the electromagnetic field data for source-receiver separations greater than the threshold offset in accordance with a first technique to obtain information on the background strata configuration; and processing electromagnetic field data obtained for source-receiver separations less than the threshold offset in accordance with a second technique to obtain information on any subterranean resistive or conductive body within the background strata configuration.

33. A method for obtaining hydrocarbon from an area that contains a subterranean hydrocarbon reservoir, comprising:

providing at least one electromagnetic source and at least one electromagnetic receiver for transmission and detection of electromagnetic signals;

obtaining a set of electromagnetic field data from the at least one electromagnetic receiver and at least one electromagnetic source for a range of source-receiver separations;

identifying a subset of the electromagnetic field data which comprises data obtained for source-receiver separations greater than a threshold offset;

processing the subset of the electromagnetic field data for source-receiver separations greater than the threshold offset in accordance with a first technique to obtain information on the background strata configuration;

processing electromagnetic field data obtained for source-receiver separations less than the threshold offset in accordance with a second technique to obtain information on any hydrocarbon reservoir within the background strata configuration;

identifying the hydrocarbon reservoir from the results of processing electromagnetic field data in accordance with the second technique;

penetrating the identified hydrocarbon reservoir with a hydrocarbon-producing well; and extracting the hydrocarbon from the reservoir using the well.

34. A volume of hydrocarbon obtained from an area that contains a subterranean hydrocarbon reservoir, the volume of hydrocarbon obtained by:

providing at least one electromagnetic source and at least one electromagnetic receiver for transmission and detection of electromagnetic signals;

obtaining a set of electromagnetic field data from the at least one electromagnetic receiver and at least one electromagnetic source for a range of source-receiver separations;

identifying a subset of the electromagnetic field data which comprises data obtained for source-receiver separations greater than a threshold offset;

processing the subset of the electromagnetic field data for source-receiver separations greater than the threshold offset in accordance with a first technique to obtain information on the background strata configuration;

processing electromagnetic field data obtained for source-receiver separations less than the threshold offset in accordance with a second technique to obtain information on any hydrocarbon reservoir within the background strata configuration;

identifying the hydrocarbon reservoir from the results of processing electromagnetic field data in accordance with the second technique;

penetrating the identified hydrocarbon reservoir with a hydrocarbon-producing well; and extracting the hydrocarbon from the reservoir using the well to obtain the volume of hydrocarbon.

* * * * *